(12) United States Patent
Pollex

(10) Patent No.: US 8,941,989 B2
(45) Date of Patent: Jan. 27, 2015

(54) TABLET COMPUTER HOLDER AND STAND

(76) Inventor: James W. Pollex, Appleton, WI (US)

( * ) Notice: Subject to any disclaimer, the term of this patent is extended or adjusted under 35 U.S.C. 154(b) by 312 days.

(21) Appl. No.: 13/248,977

(22) Filed: Sep. 29, 2011

(65) Prior Publication Data

US 2012/0075799 A1    Mar. 29, 2012

Related U.S. Application Data

(60) Provisional application No. 61/387,509, filed on Sep. 29, 2010.

(51) Int. Cl.
| | | |
|---|---|---|
| *G06F 1/16* | (2006.01) | |
| *F16M 13/00* | (2006.01) | |
| *F16M 11/04* | (2006.01) | |
| *F16M 11/10* | (2006.01) | |
| *F16M 11/20* | (2006.01) | |
| *F16M 13/02* | (2006.01) | |
| *F16M 13/04* | (2006.01) | |

(52) U.S. Cl.
CPC .......... *G06F 1/1626* (2013.01); *F16M 11/041* (2013.01); *F16M 11/105* (2013.01); *F16M 11/2078* (2013.01); *F16M 13/00* (2013.01); *F16M 13/02* (2013.01); *F16M 13/04* (2013.01); *G06F 1/166* (2013.01); *A45F 2200/0525* (2013.01)
USPC ............ 361/679.59; 361/679.55; 361/679.56; 248/418

(58) Field of Classification Search
CPC ...... G06F 1/1616; G06F 1/162; G06F 1/1622
USPC ............. 361/679.01–679.45, 679.55–679.59; 345/156, 157; 248/418
See application file for complete search history.

(56) References Cited

U.S. PATENT DOCUMENTS

| | | | | |
|---|---|---|---|---|
| 5,329,712 A | * | 7/1994 | Keller | .............................. 40/747 |
| 5,349,497 A | * | 9/1994 | Hanson et al. | ............ 361/679.58 |
| 5,941,493 A | * | 8/1999 | Cheng | ............................ 248/371 |
| D506,195 S | * | 6/2005 | Leveridge et al. | ............ D14/341 |
| 7,232,098 B2 | * | 6/2007 | Rawlings et al. | ............. 248/121 |
| 8,152,113 B2 | * | 4/2012 | Chen et al. | ..................... 248/150 |
| 8,422,208 B2 | * | 4/2013 | Wang | ....................... 361/679.01 |
| 2003/0213822 A1 | * | 11/2003 | Lautner | ......................... 224/221 |
| 2007/0076362 A1 | * | 4/2007 | Lagnado | ....................... 361/683 |

(Continued)

OTHER PUBLICATIONS

Website screenshot for belkin Products; http://www.belkin.com/IWCatProductPage.process?&Product_Id=608855&subid=525954; printed May 18, 2012.

(Continued)

*Primary Examiner* — Nidhi Desai
(74) *Attorney, Agent, or Firm* — Stewart IP Law

(57) ABSTRACT

A handle assembly for a hand held tablet computer or other handheld electronic device, the assembly including a tablet mounted assembly adhered to the back side of the tablet computer opposite the tablet's screen and a handle removably mounted to the tablet mounted assembly. The handle is rotatable permitting a user to hold the tablet computer within one hand and rotate the tablet computer to access the screen from any desired angle. The handle may include at least one tab and the tablet mounted portion includes at least one opening sized to receive the tab. The mounting plate may include a release tab to releasably engage a recess in the base plate of the handle to secure the tab of the handle within the opening of the mounting plate.

15 Claims, 27 Drawing Sheets

(56) References Cited

U.S. PATENT DOCUMENTS

2008/0156836 A1* 7/2008 Wadsworth et al. .......... 224/269
2009/0020672 A1* 1/2009 Lai et al. .................... 248/274.1
2011/0267748 A1* 11/2011 Lane et al. ............... 361/679.01

OTHER PUBLICATIONS

Website screenshot for FreeOneHand iPAD Holder and Stand; http://techcrunch.com/2010/11/23/freeonehand-ipad-holder-and-stand-simply-grip-the-rod/; printed May 18, 2012.

Website screenshot for Pistol Grip Mobile Computer; http://www.directindustry.com/prod/psion-teklogix/pistol-grip-mobile-computers-6147-15893.html; printed May 18, 2012.

Website screenshot of The Gadget Gurus; http://thegadgetgurus.net/guru-inspection-bracketron-twist-360-for-ipad/; printed May 18, 2012.

Website screenshot for Camera Hand Grip; http://cheesycam.com/camera-hand-grip/; printed May 18, 2012.

* cited by examiner

TABLET COMPUTER HOLDER AND STAND

CROSS-REFERENCE TO RELATED APPLICATION

The present application claims priority to U.S. Provisional Application Ser. No. 61/387,509, filed on Sep. 29, 2010, the disclosure of which is incorporated herein by reference.

BACKGROUND

Tablet computers have made great strides in the marketplace of portable computers and have become a popular choice for consumers looking for easily transportable and usable computers. Characteristics of such computers include a touch screen for data entry and a smaller form factor to permit easier handling and transportation. However, even with the reduced form factor and size, manipulation of a tablet computer can be challenging. If a user holds the computer with one hand, it may be difficult to enter data with the other hand. The touch screens are typically larger than a smart phone screen, so a user is not easily able to cradle the tablet computer in both hands and use both thumbs to enter data. Thus, during holding and data entry, the tablet computer is typically held awkwardly in one hand or cradled in an arm while the opposite hand accesses the touch screen.

In addition, most of not all tablet computers have been manufactured with sleek exterior surfaces that make securing the tablet computer difficult. When the computers are placed on a table top or other support surface, this is not a particular problem but when using the computer in a hand-held mode, the possible loss of control or dropping of the computer is an issue.

Still further, many of these tablet computers are used to display images or video, either for entertainment or business purposes. Merely placing the computer flat on a table top does not provide a desirable viewing angle and does not permit the election of either landscape or portrait orientation of the display.

It is desirable to have improvement to the design and/or accessories for conventional tablet computers. It is not intended that the present disclosure be limited to only those accessories that address these issues. These issues are merely illustrative of problems or concerns during the use of tablet computers that have arisen and it is not intended that this be an exhaustive list of the issues or concerns relating to tablet computers and the use thereof.

BRIEF DESCRIPTION OF THE DRAWINGS

The accompanying drawing figures, which are incorporated in and constitute a part of the description, illustrate several aspects of the invention and together with the description, serve to explain the principles of the invention. A brief description of the figures is as follows.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
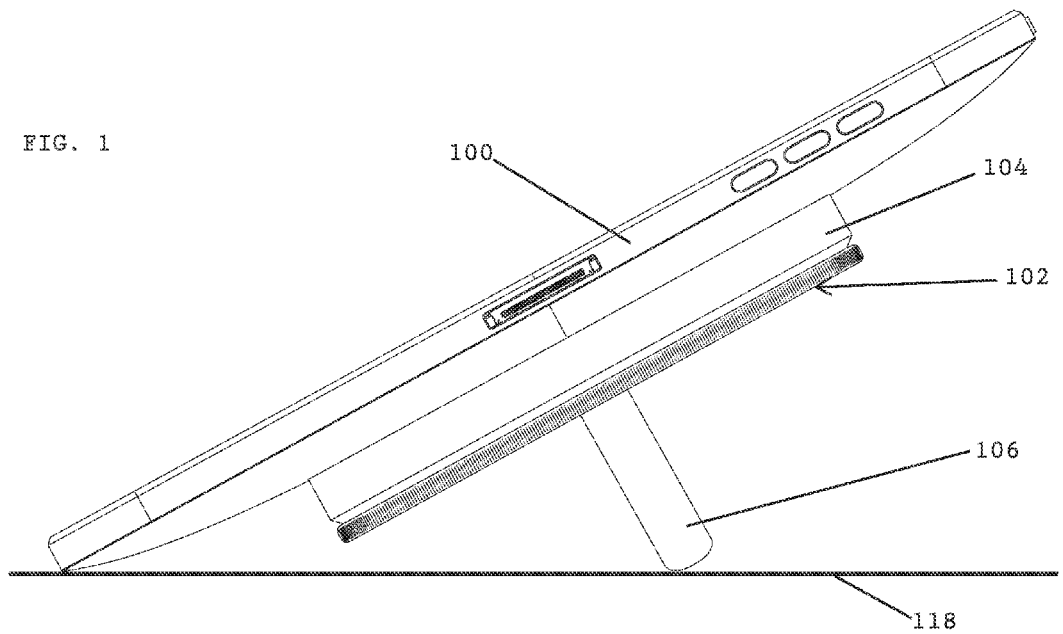
FIG. 1 is a side view of a tablet computer with a handle assembly according to the present disclosure mounted to a rear surface of the computer.

FIG. 1 illustrates a tablet computer 100 with a handle assembly 102 according to the present disclosure attached to a rear surface of the computer. Handle assembly 102 is comprised of a base assembly 104 and a handle 106 rotatably and removably mounted to the base assembly. As shown, the computer and handle assembly are resting on a table top or surface 108 with the computer elevated above horizontal to aid in viewing the screen of the computer.

Figure 2:
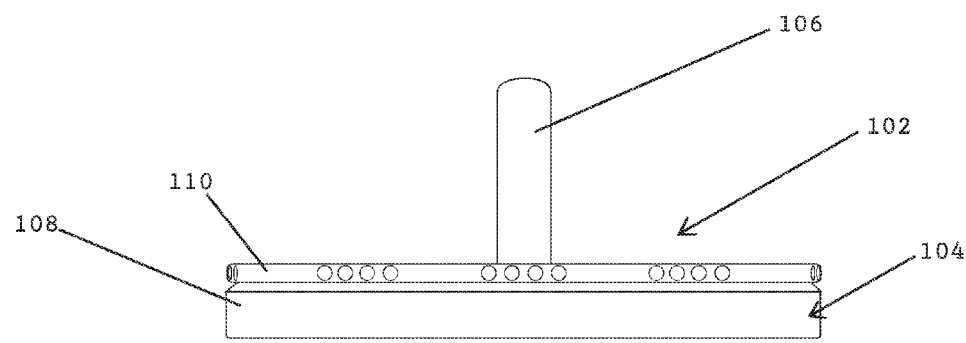
FIG. 2 is a side view of the handle assembly of FIG. 1
Figure 3:
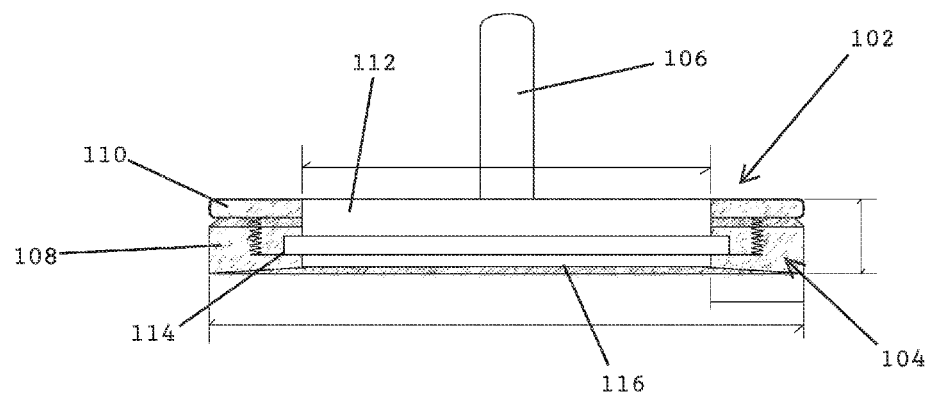
FIG. 3 is a side cross-sectional view of the handle assembly of FIG. 2.

FIG. 2 illustrates handle assembly 102 removed from the computer. Assembly 102 may include base assembly 104 with a base ring 108 and a locking ring 110 into which handle 106 is mounted. FIG. 3 illustrates the base assembly in cross-section, with handle 106 including a round base 112 of the handle having a lip 114 extending circumferentially about the base 112. Round base 112 may be received within a recess 116 of base ring 108 with locking ring 110 is positioned within recess 116 to capture lip 114 ands hold the handle to the base assembly. Other means of rotatably and releasably securing the handle to the base assembly are within the scope of the present disclosure and the drawings illustrate a current and non-limiting embodiment of an appropriate means of securing the handle.

Figure 4:
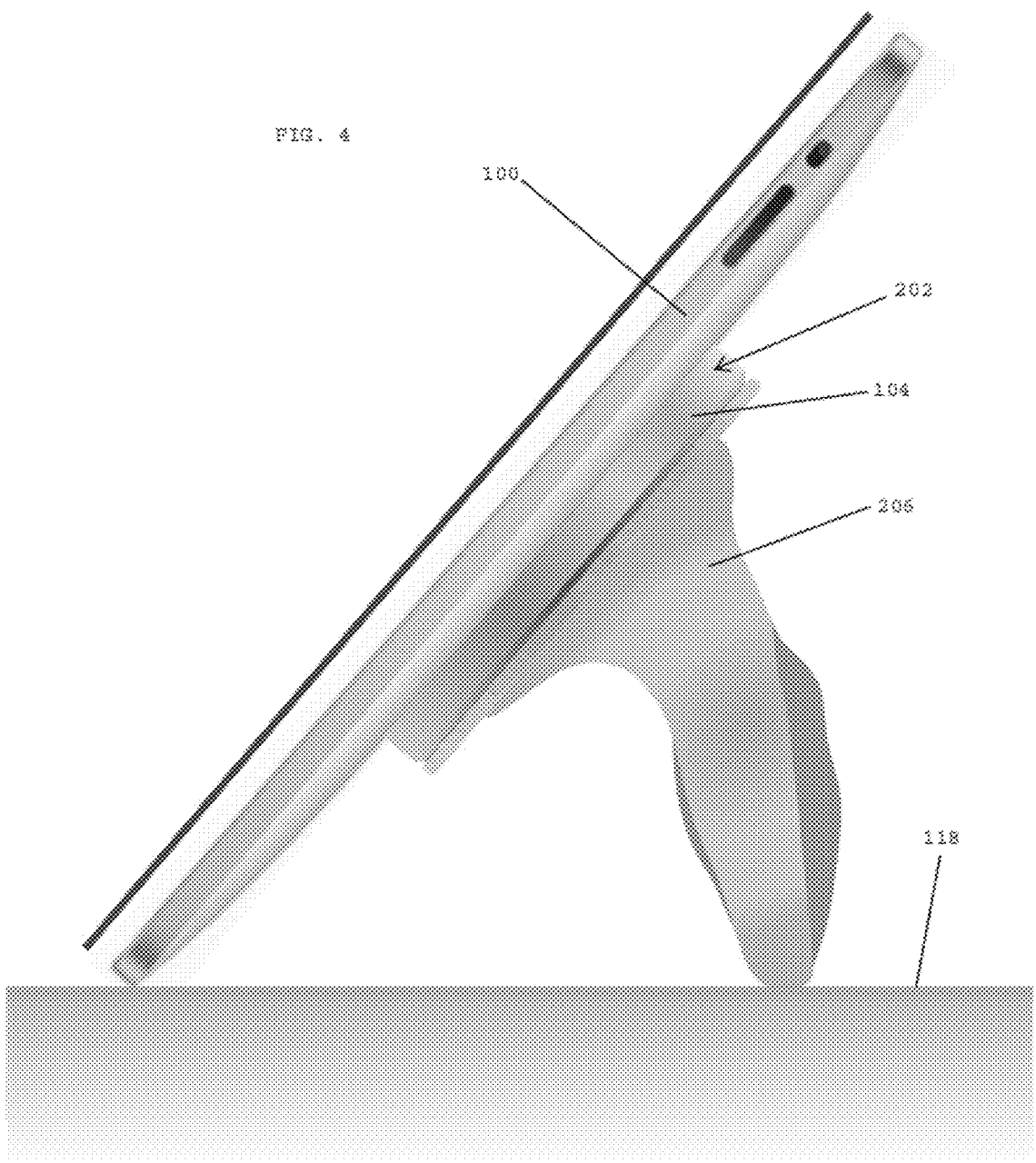
FIG. 4 is a side view of a tablet computer with a second embodiment of a handle assembly according to the present disclosure.

FIG. 4 illustrates tablet computer 100 being positioned at a first desired angle with respect to surface 118 by a handle 206 of a second embodiment of a handle assembly 202. Note that handle 206 is not symmetrical about an axis of rotation within base assembly 104 so that by rotating the handle one hundred and eighty degrees within base assembly 104 would result in the tablet computer being positioned at a second angle with respect to surface 118. Thus, the handle of the present disclosure eliminates the need to have a separate stand to hold the tablet computer to angle the screen as desired to permit viewing of images or video on the screen.

Figure 5:
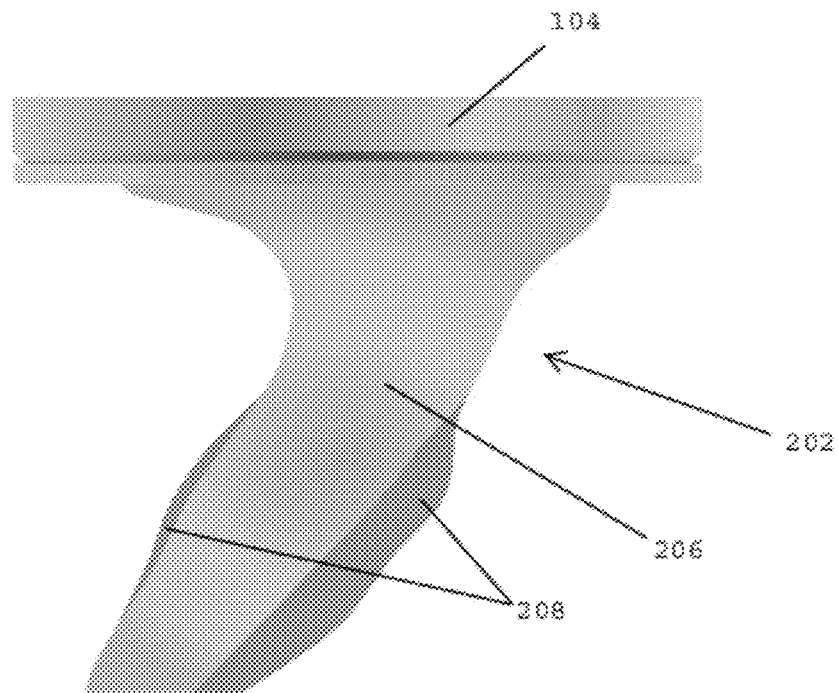
FIG. 5 is a side view of the handle assembly of FIG. 4.
Figure 6:
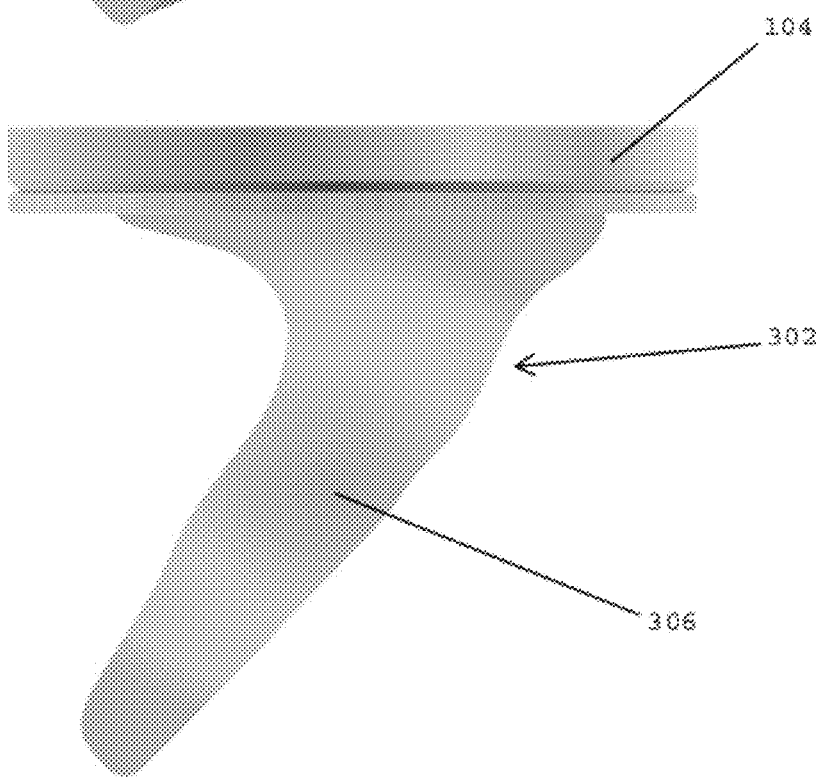
FIG. 6 is a side view of a second alternative embodiment of a handle assembly according to the present disclosure.

FIG. 5 illustrates assembly 202 removed from the tablet computer and shows the addition of added grip material 208 on an exterior of handle 206. Grip material 208 could be selected and arranged to modify the nature or shape of the grip, to provide different colors on grip 206, to aid in friction of an exterior of grip 206, or may be added for others reasons or purposes. It is not intended to limit the scope of the present disclosure with regard to the nature of what material may be added to a grip according to the present disclosure or the reasons for which the material may be added. FIG. 6 illustrates a grip assembly 302 with a grip 306 having no added material on an exterior of the grip.

Figure 7:
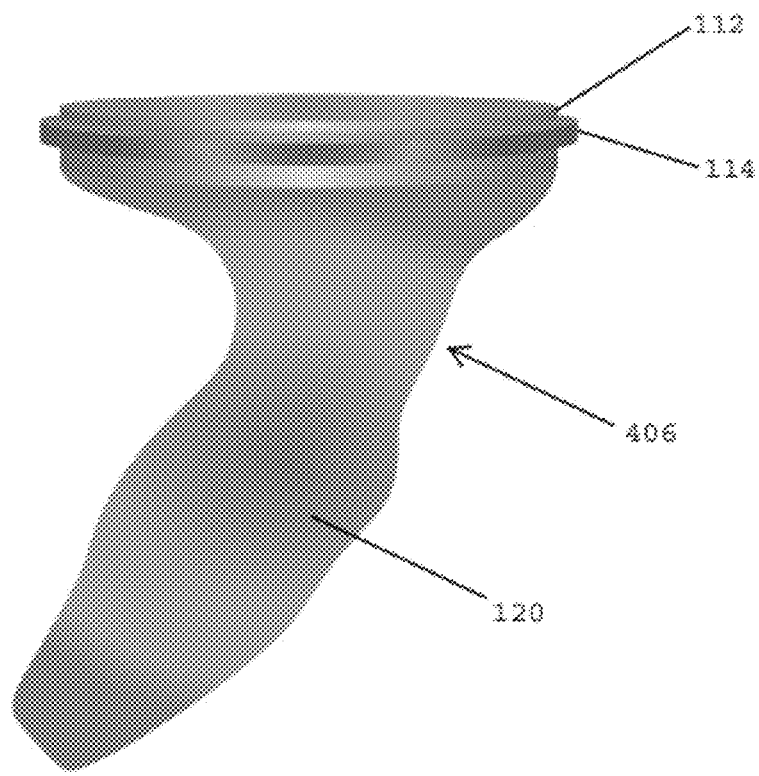
FIG. 7 is a perspective view of an alternative embodiment of a handle for use with a handle assembly according to the present disclosure.
Figure 8:
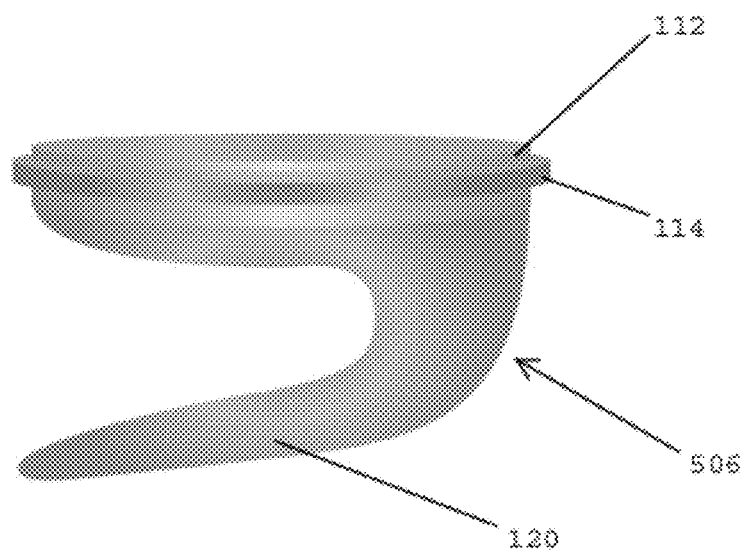
FIG. 8 is a perspective view of a second alternative embodiment of a handle for use with a handle assembly according to the present disclosure.

FIGS. 7 and 8 illustrate alternative embodiments of grips 406 and 506 for use with the present disclosure and configured to be rotatably and releasably received within base assembly 104. Each of these grips includes a mating base 112 and lip 114.

Figure 9:
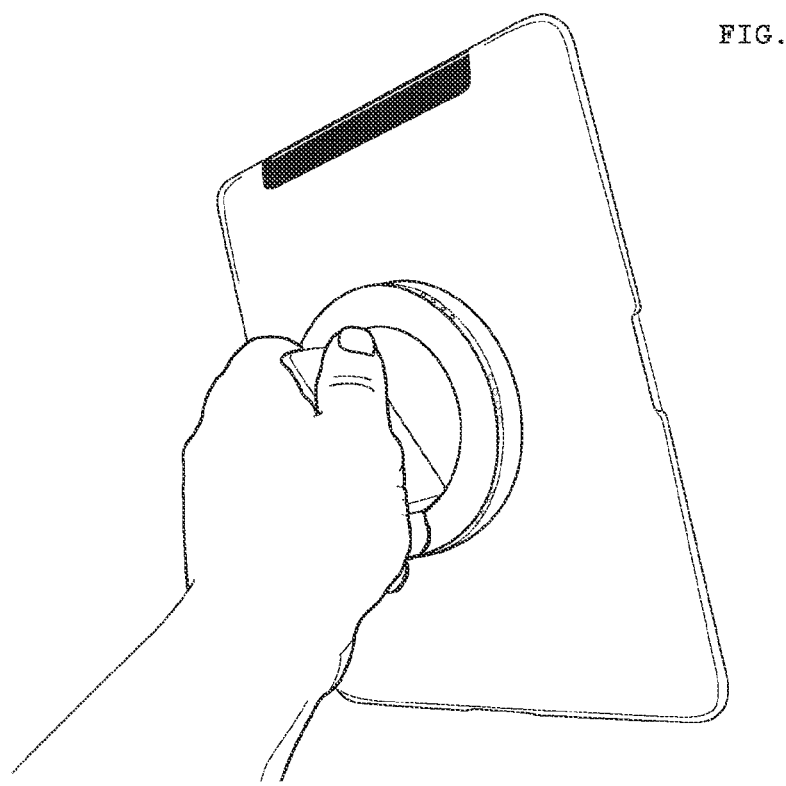
FIG. 9 is a first image of a handle assembly according to the present disclosure mounted to the rear surface of a tablet computer.
Figure 10:
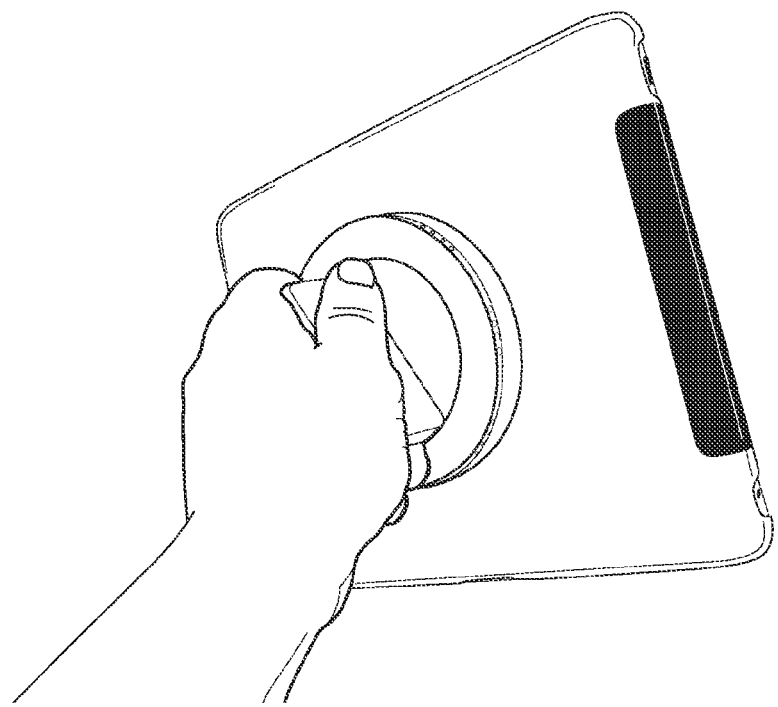
FIG. 10 is a second image of the tablet computer and handle assembly of FIG. 9.

FIGS. 9 and 10 illustrate tablet computer 100 and handle assembly 102 held by a user in different orientations. The handle assembly of the present disclosure preferably permit easy rotation through a full three hundred and sixty degrees so that the user may grasp the handle and orient the computer in any positioned desired.

Figure 11:
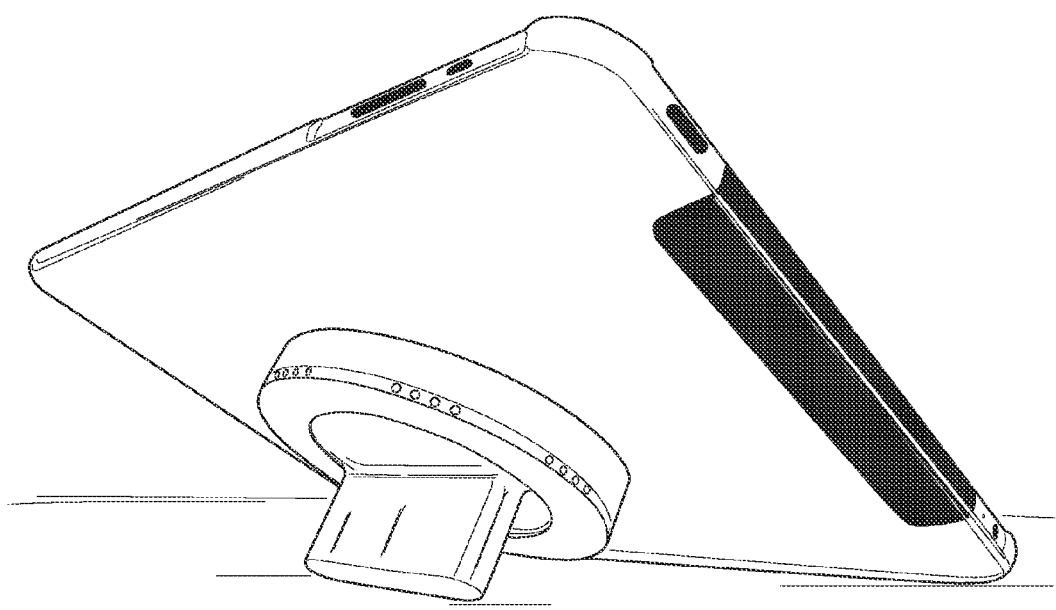
FIG. 11 is an image of the tablet computer and handle assembly of FIG. 9 resting on a table with the screen oriented in landscape mode.

FIG. 11 illustrates tablet computer 100 and handle assembly 102 positioned on surface 118 with the computer screen in a landscape orientation. Most tablet computers have a position sensor that will automatically orient the screen based on the angle at which the tablet is held. However, for these sensors to operate, the tablet needs to be held at angle to horizontal. By elevating or angling the tablet computer above the surface, and holding the tablet computer to select the desired screen orientation, a user may better control the nature of the images or video on the computer screen.

Figure 12:
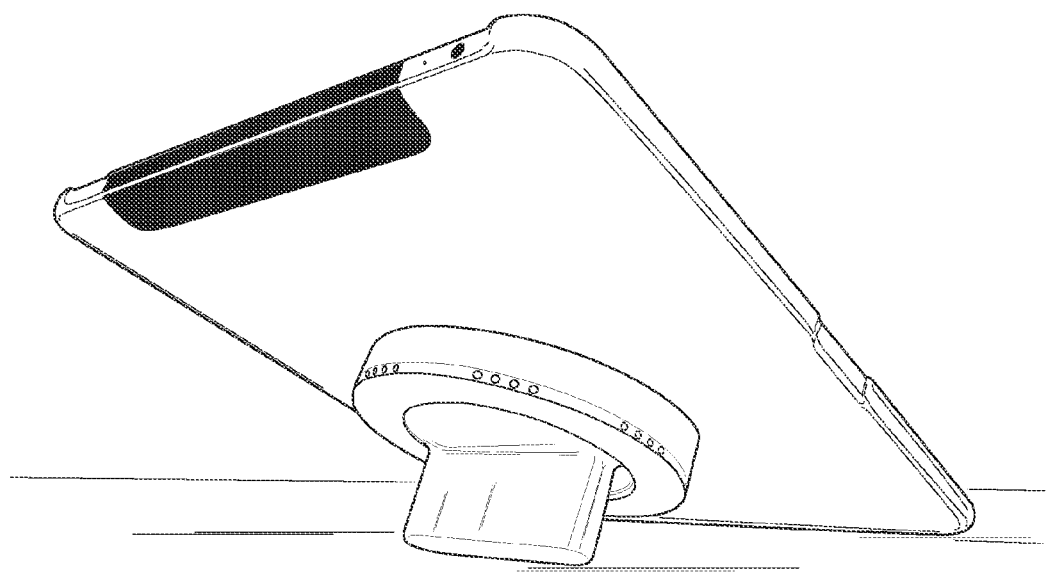
FIG. 12 is an image of the tablet computer and handle assembly of FIG. 9 resting on a table with the screen oriented in portrait mode.
Figure 13:
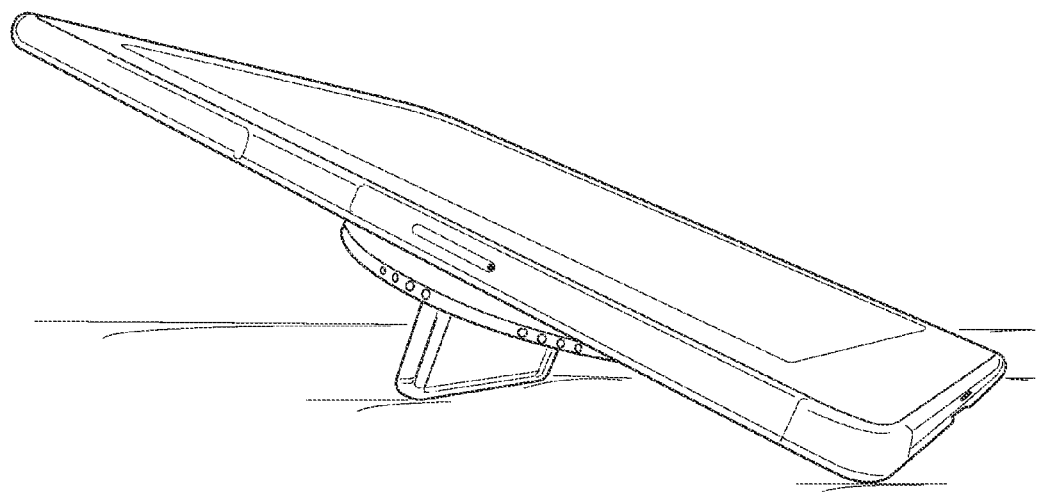
FIG. 13 is a second image of tablet computer and handle assembly of FIG. 12.

FIGS. 12 and 13 illustrate tablet computer 100 and handle assembly 102 positioned on surface 118 with the computer screen in a portrait orientation. Note that if the tablet computer is rectangular in shape, as opposed to square, positioning the handle to display in landscape or portrait orientation will also result in the computer screen being positioned at different angles with respect to surface 118. This permits a user to select both the desired orientation of the screen and the desired angle of the screen above the surface on which it is placed.

Figure 14:
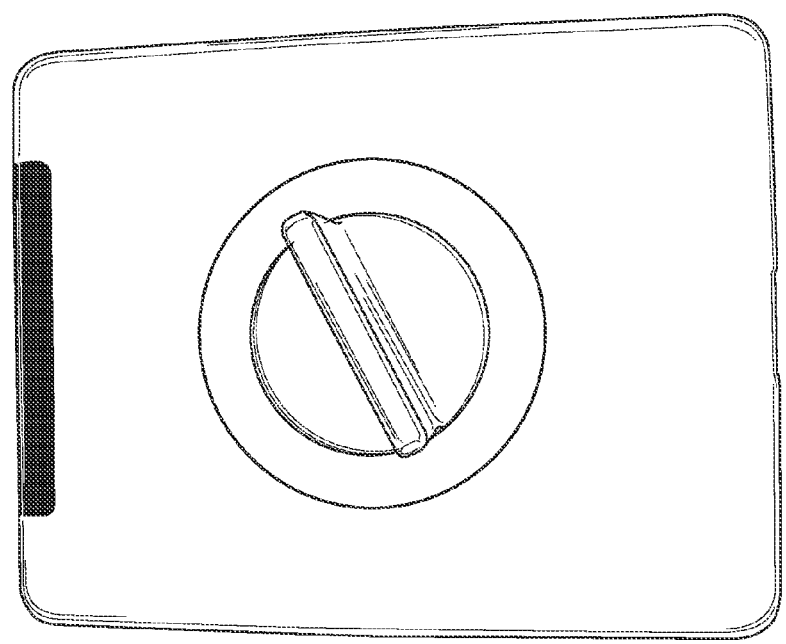
FIG. 14 is an image of the rear of the tablet computer and handle assembly of FIG. 9.
Figure 15:
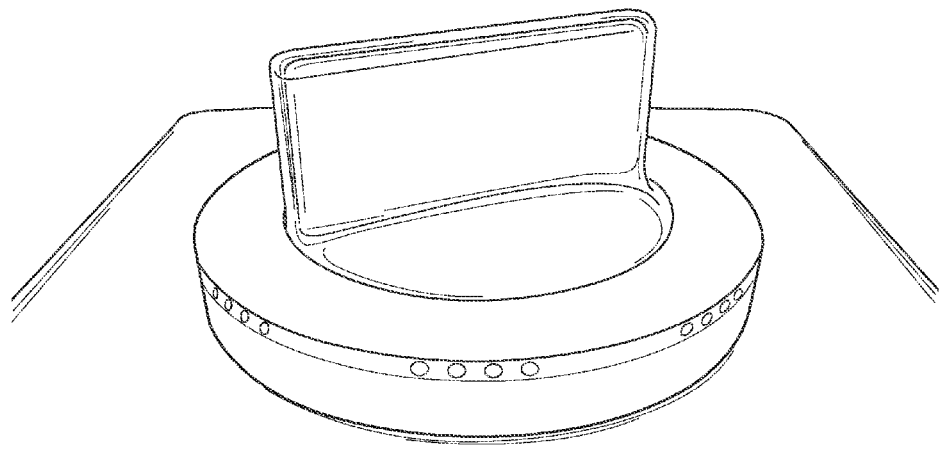
FIG. 15 is a closer image of the handle assembly of FIG. 14.

FIGS. 14 and 15 are additional rear views of tablet computer 100 and handle assembly 102.

Figure 16:
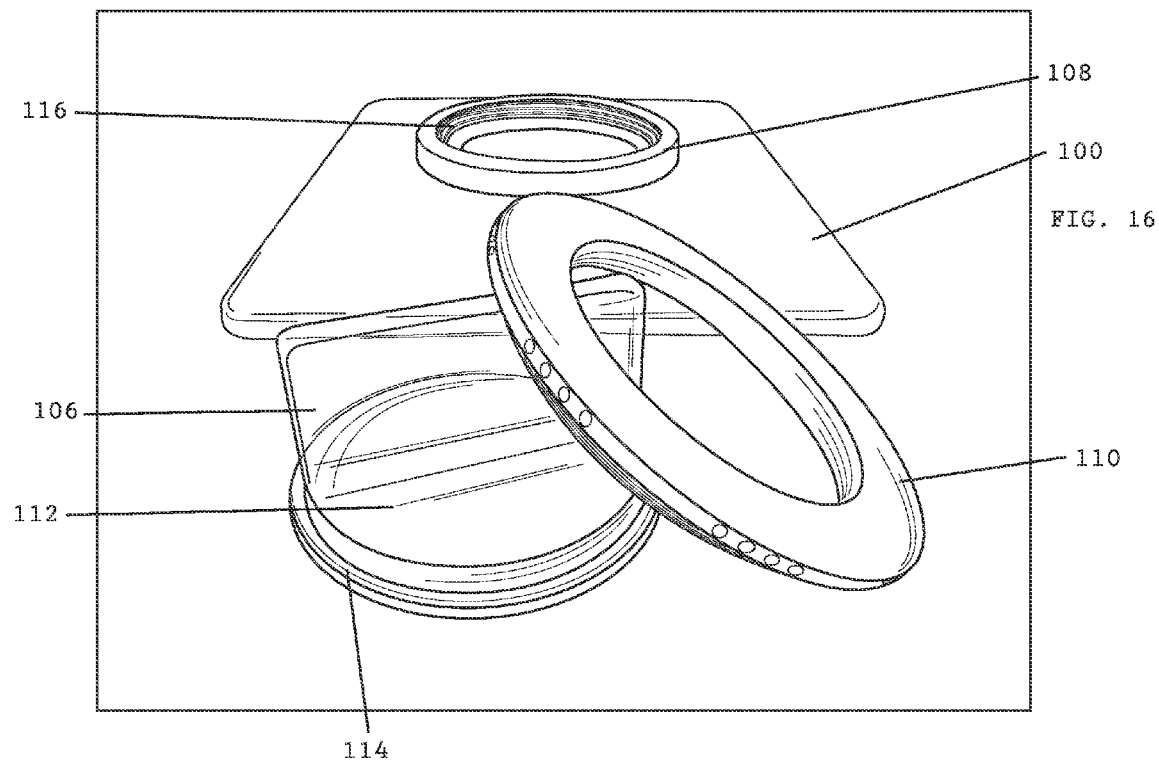
FIG. 16 is an image of the handle assembly of FIG. 14 with a locking ring and a handle removed from a base.
Figure 17:
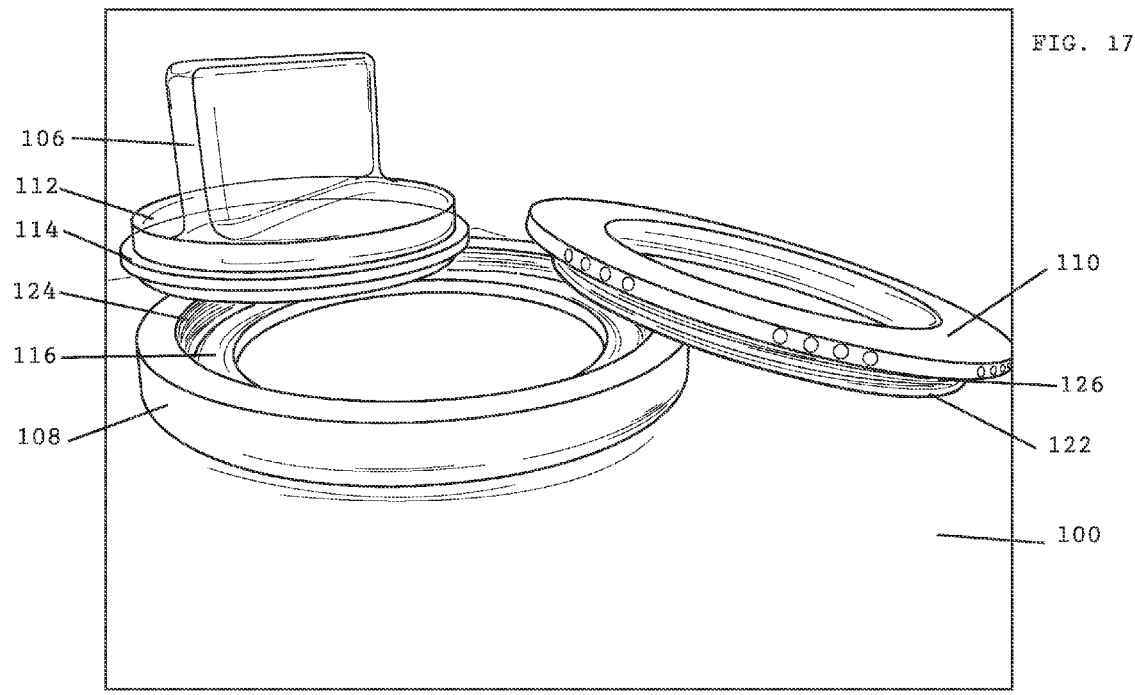
FIG. 17 is a second image of the disassembled handle assembly of FIG. 16.

FIG. 16 is a view of a disassembled handle assembly 104, including base ring 108 defining recess 116, locking ring 110, handle 106 with round base 112 and lip 114. FIG. 17 illustrates the beginning of assembly of the various elements into handle assembly 102. Locking ring 110 may include a lower portion 122 configured to engage and capture lip 114 within recess 116. Recess 116 and locking ring 110 may include mating threaded portions, 124 and a26, respectively, that releasably engage each other to secure handle 106 to assembly 102 while allowing free rotation of handle 106 as desired by the user.

Figure 19:
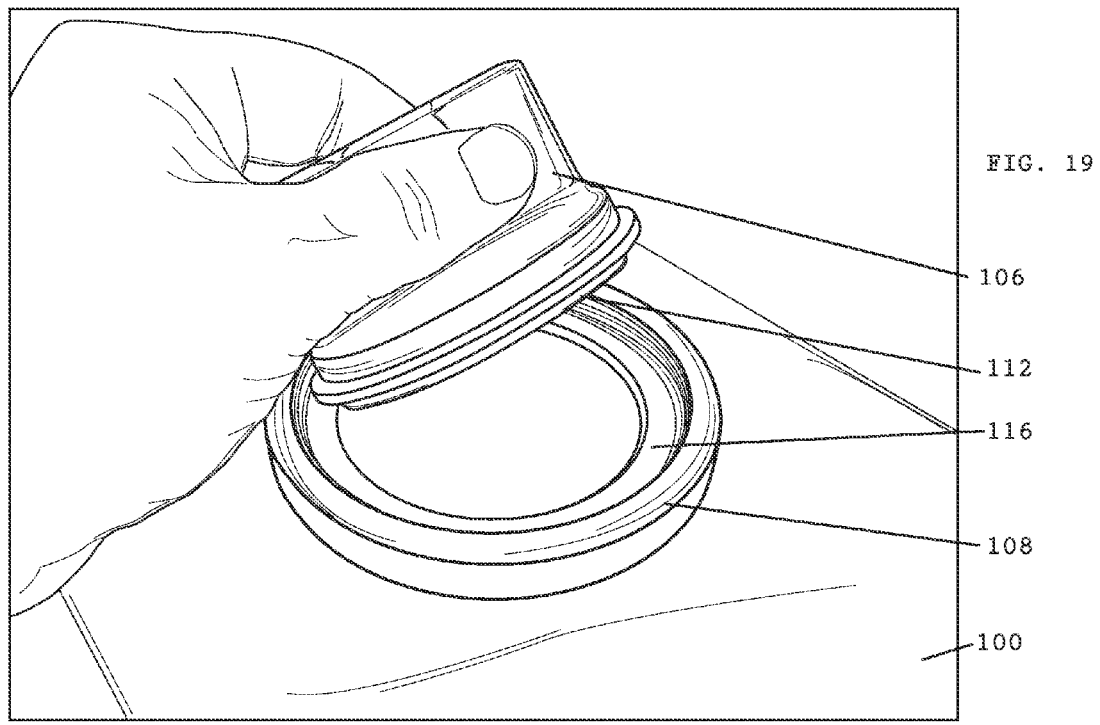
FIGS. 19 to 22 are images illustrating a process of assembly of the handle assembly of the present disclosure.
Figure 20:
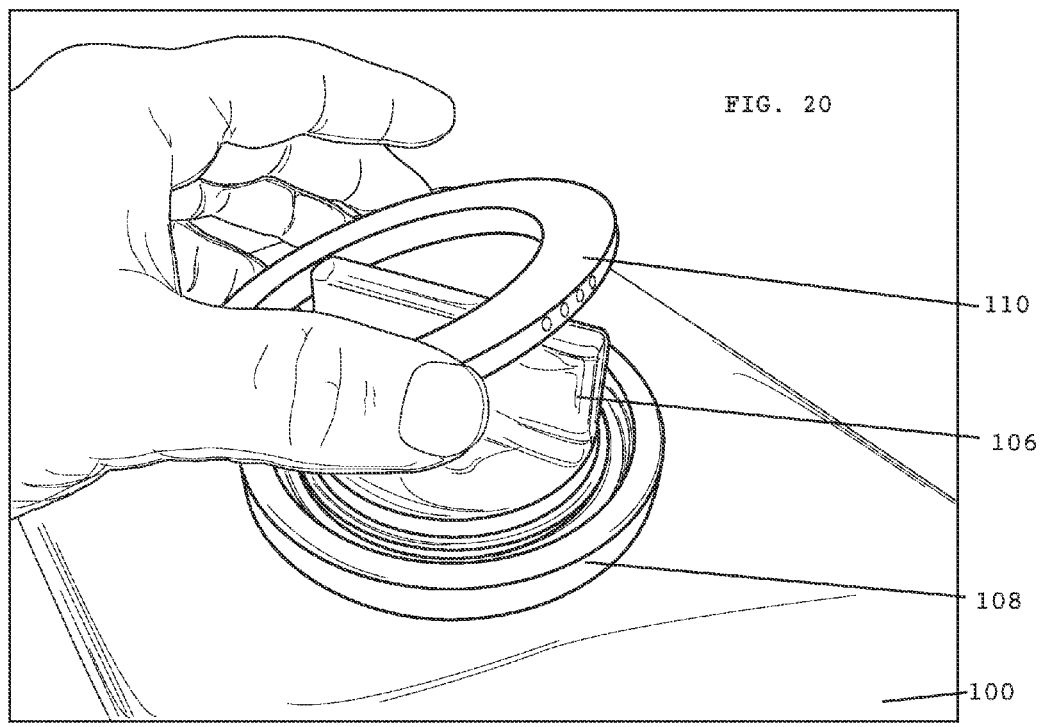

FIGS. 19 and 20 illustrate steps to perform the assembly of the elements into assembly 102.

Figure 18:
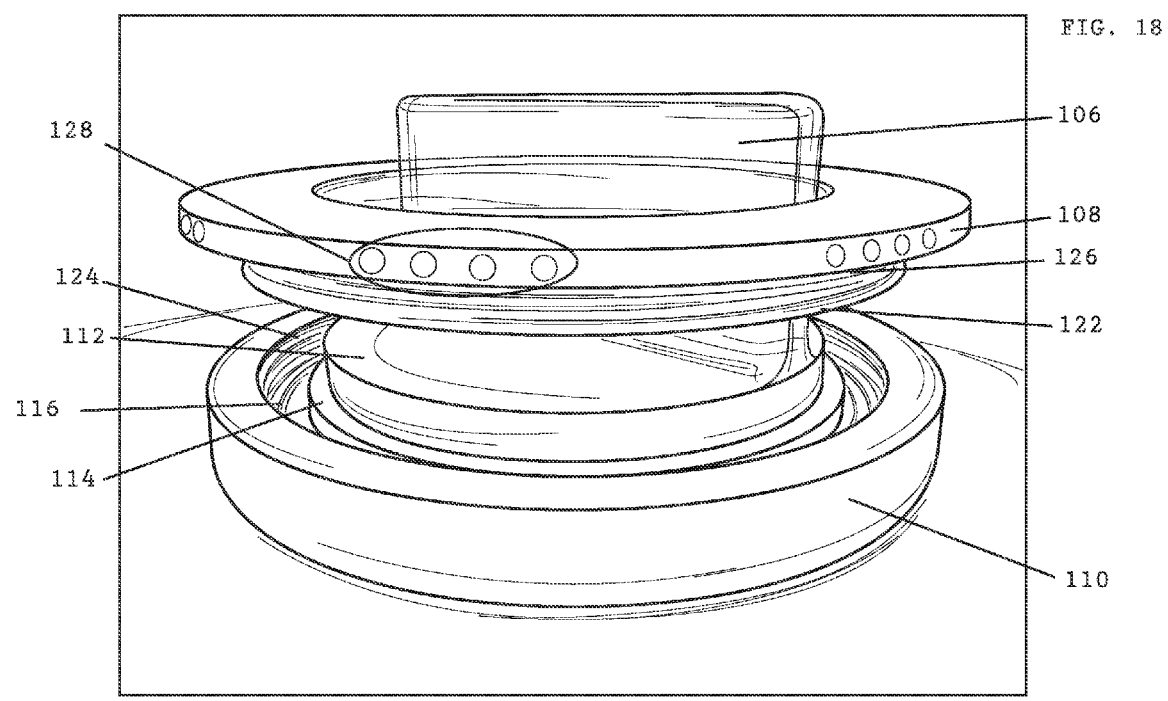
FIG. 18 is a third image of the disassembled handle assembly of FIG. 16.

FIG. 18 illustrates handle 106 positioned within recess 116 and locking ring 110 positioned to engage base ring 108. Along an exterior portion of locking ring 110 may be a plurality of elements 128 that may serve dual purposes of providing improved grip for tightening or loosening locking ring 110 with base ring 108, as well as providing decorative or customizable visual elements to handle assembly 102.

Figure 21:
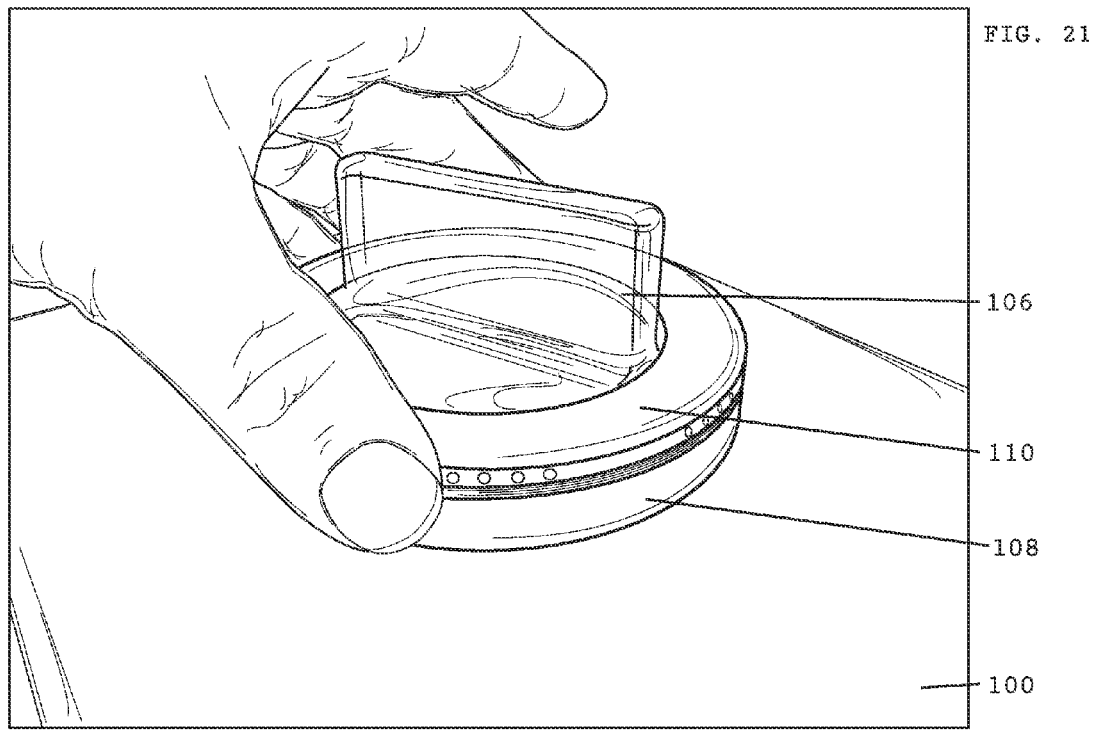
Figure 22:
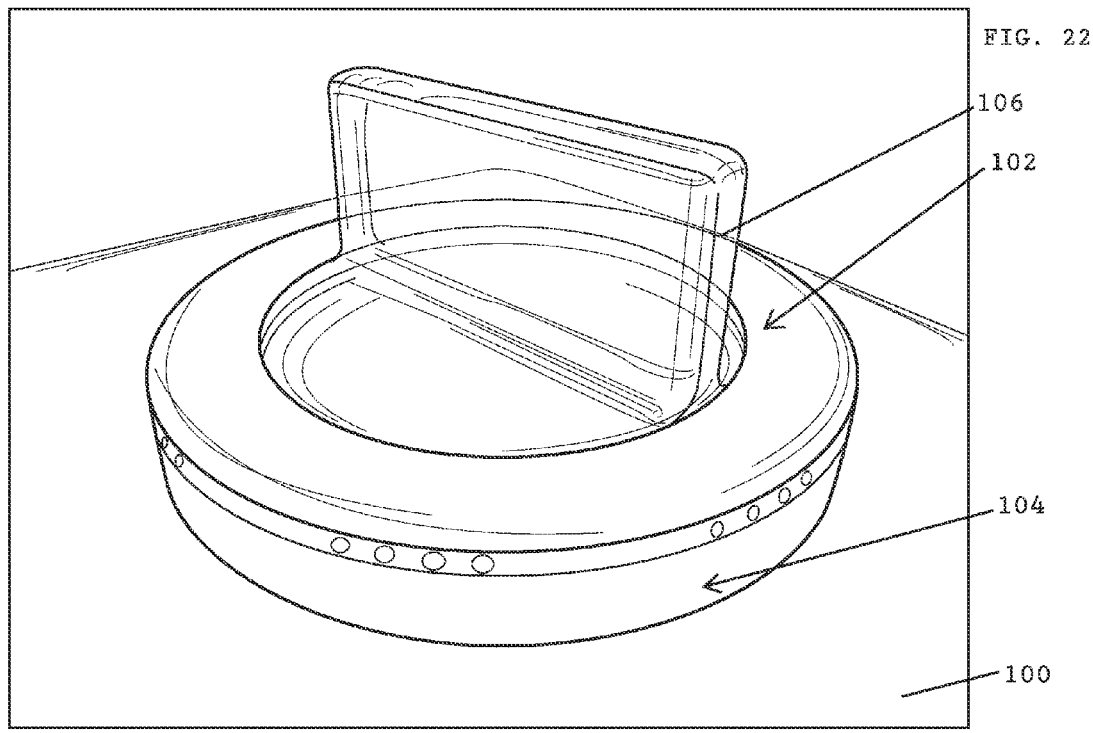

FIG. 21 illustrates a user engaging the threads of locking ring 110 and base ring 108 to secure handle 106 into handle assembly 102 and FIG. 22 shows handle assembly 102 fully configured and mounted to the rear of tablet computer 100.

Figure 23:
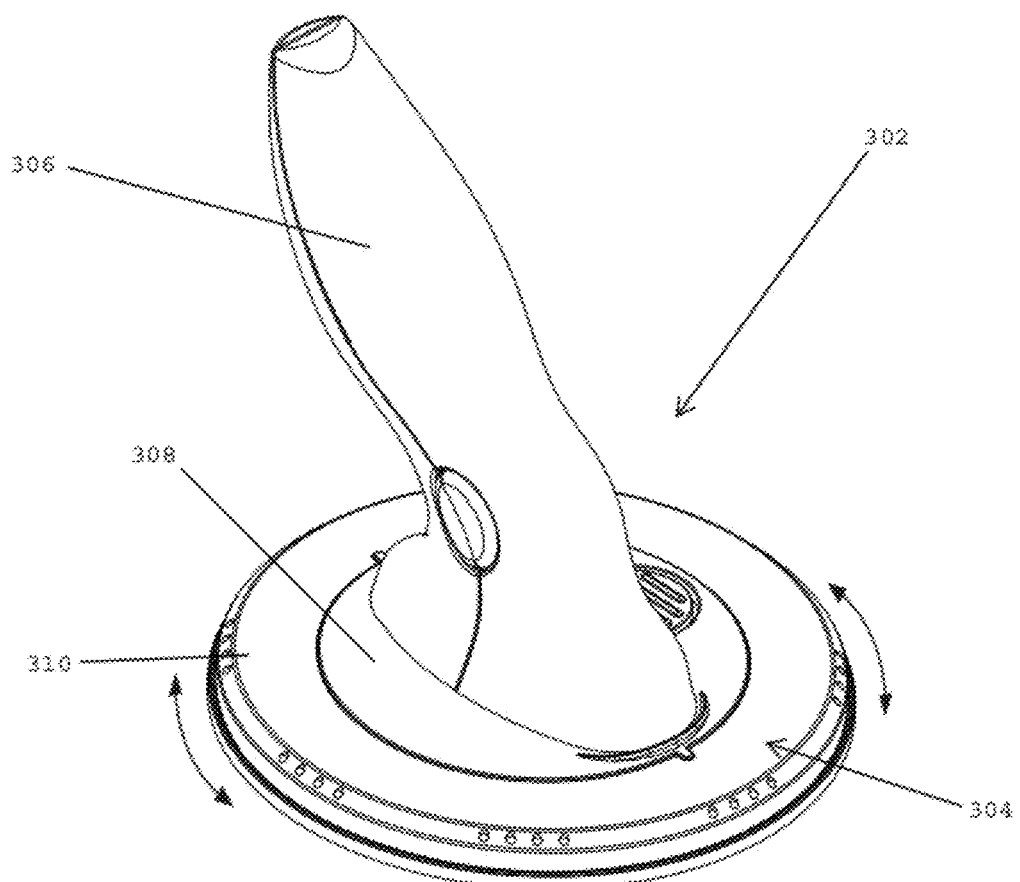
FIG. 23 is a perspective view of a second embodiment of a handle assembly according to the present disclosure.

FIG. 23 illustrates a further embodiment of a handle assembly according 302 according to the present disclosure, with a tablet mounted assembly 304 and a removable handle 306. Visible in this FIG. are two elements that are part of tablet mounted assembly 304, an outer rotating ring 310 and an inner mounting plate 308. These two elements are rotatably mounted to a fixed ring (shown in FIGS. below) and are configured to rotate together to permit positioning of handle 306 with respect to the tablet device as desired by a user. FIG. 23 illustrates an embodiment that permits the removal of handle 306 without disassembly of the tablet mounting assembly, as described above. Removal of the handle is accomplished by a different series of steps, as described below, but once attached, handle assembly 300 is functionally equivalent to the handle assemblies previously described.

Figure 24:
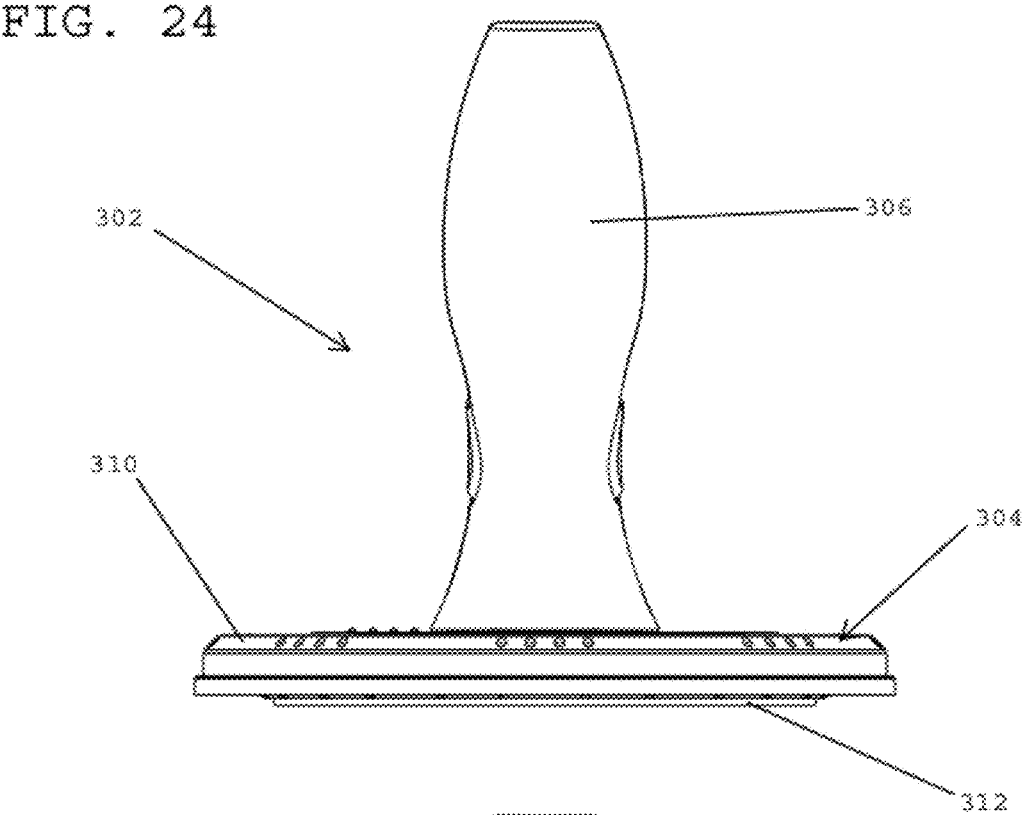
FIG. 24 is a back side view of the handle assembly of FIG. 23.
Figure 25:
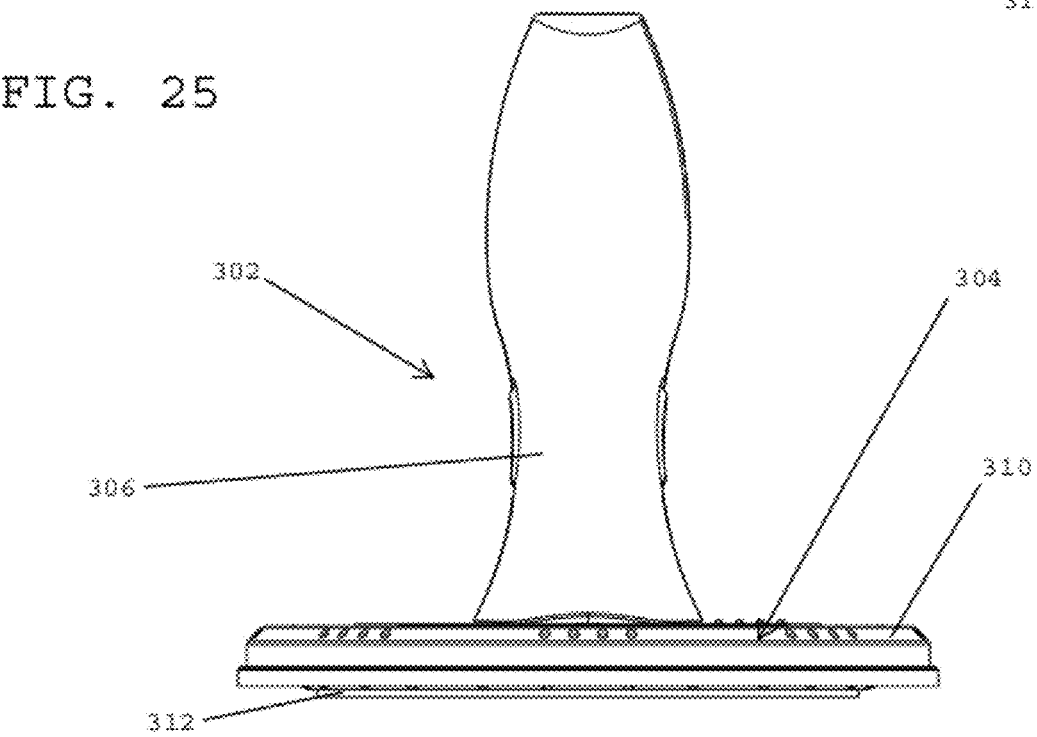
FIG. 25 is a front side view of the handle assembly of FIG. 23.
Figure 26:
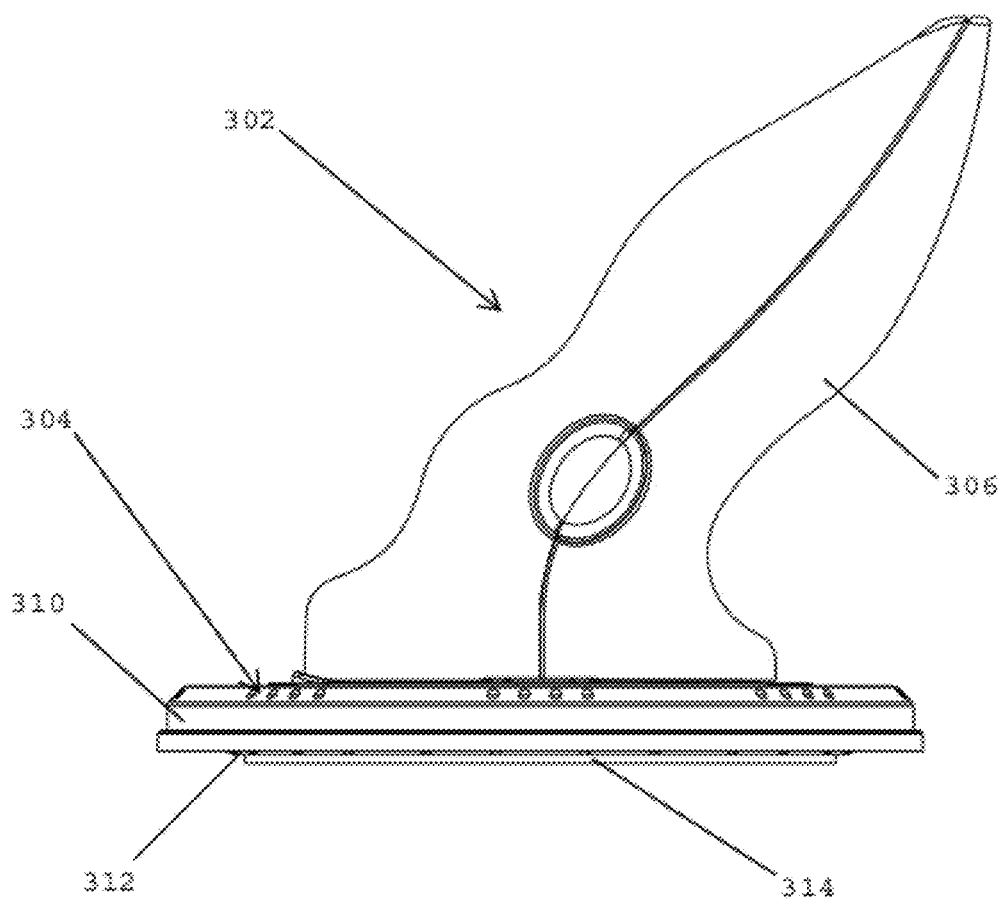
FIG. 26 is a side view of the handle assembly of FIG. 23.

FIGS. 24 and 25 are back and front side views of handle assembly 302 and fixed ring 312 is visible underneath rotating ring 310. FIG. 26 is a side of handle assembly 302 also showing fixed ring 312. Fixed ring 312 may included an adhesive ring 314 for affixing the tablet mounted assembly to a tablet device. Alternative mounting arrangements are anticipated as being within the scope of the present disclosure and may include but are not limited to temporary or permanent boding adhesives that are applied to either the tablet or the handle assembly, double sided adhesive tape, adhesive tape that may be thinner than that shown in the FIGS., or other methods of mounting the handle assembly to a tablet device. It is also anticipated that the mounting of the handle assembly may be directly to a back surface of the tablet itself or to a skin, case, cover, or other accessory that covers the back surface of the tablet device.

Figure 27:
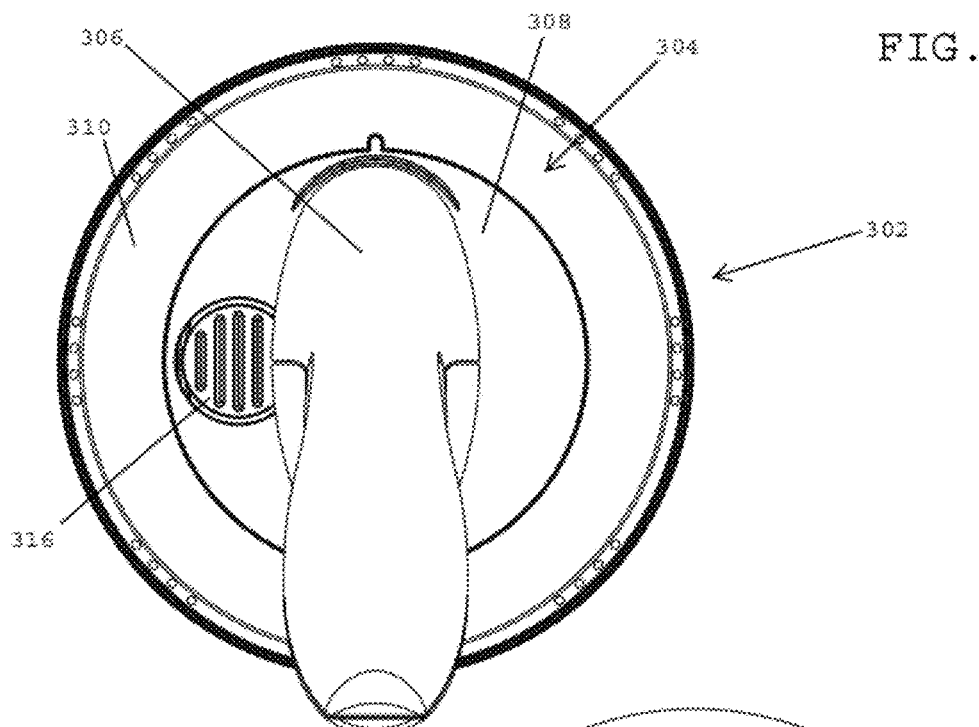
FIG. 27 is a top view of the handle assembly of FIG. 23.
Figure 28:
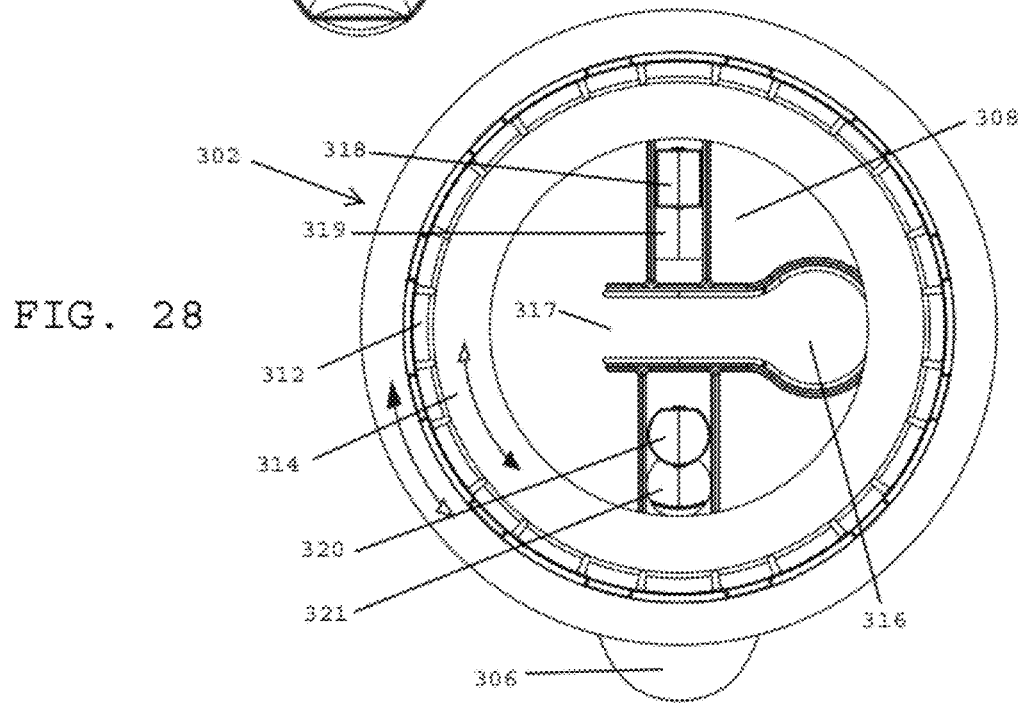
FIG. 28 is a bottom view of the handle assembly of FIG. 23.
Figure 29:
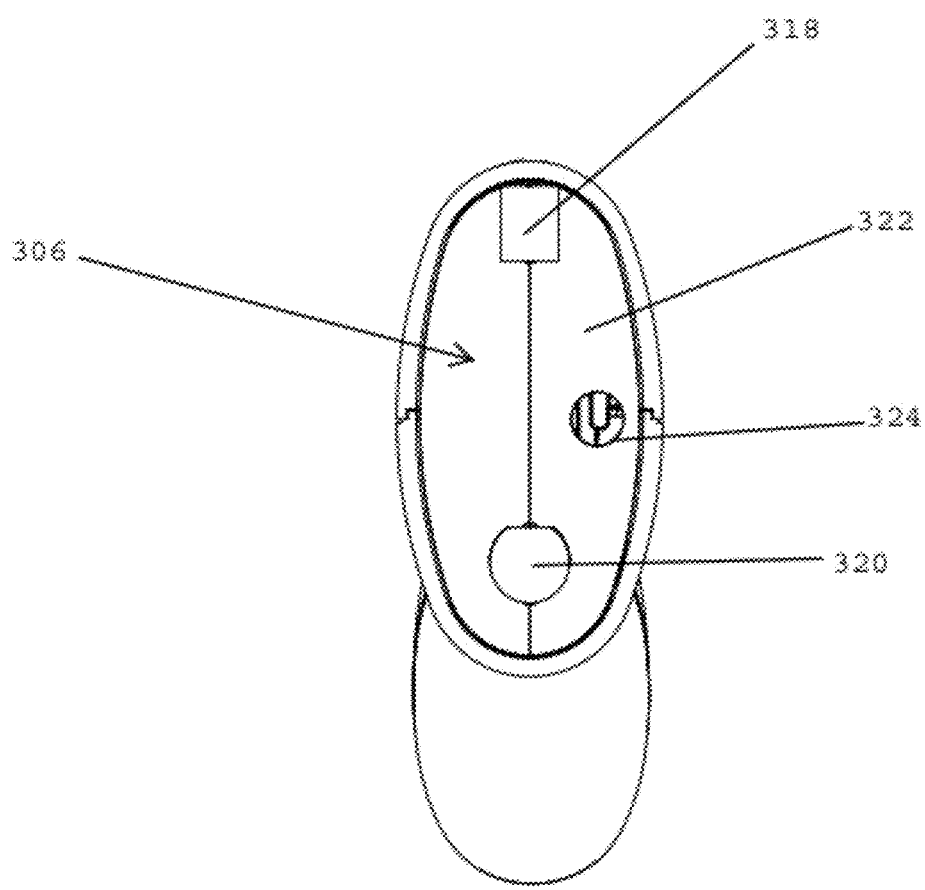
FIG. 29 is a bottom view of a removable handle of the handle assembly of FIG. 23.
Figure 30:
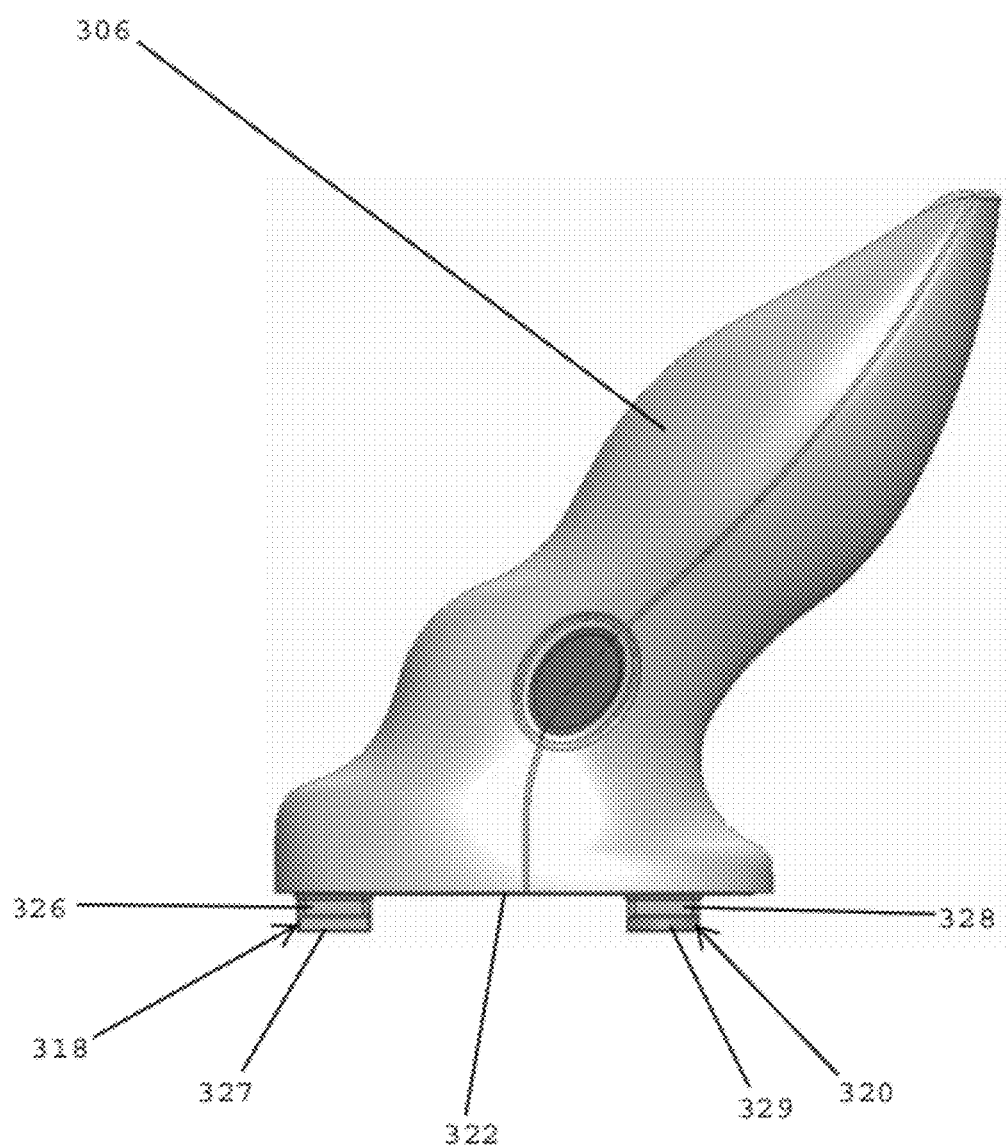
FIG. 30 is a side view of the removable handle of FIG. 29.
Figure 31:
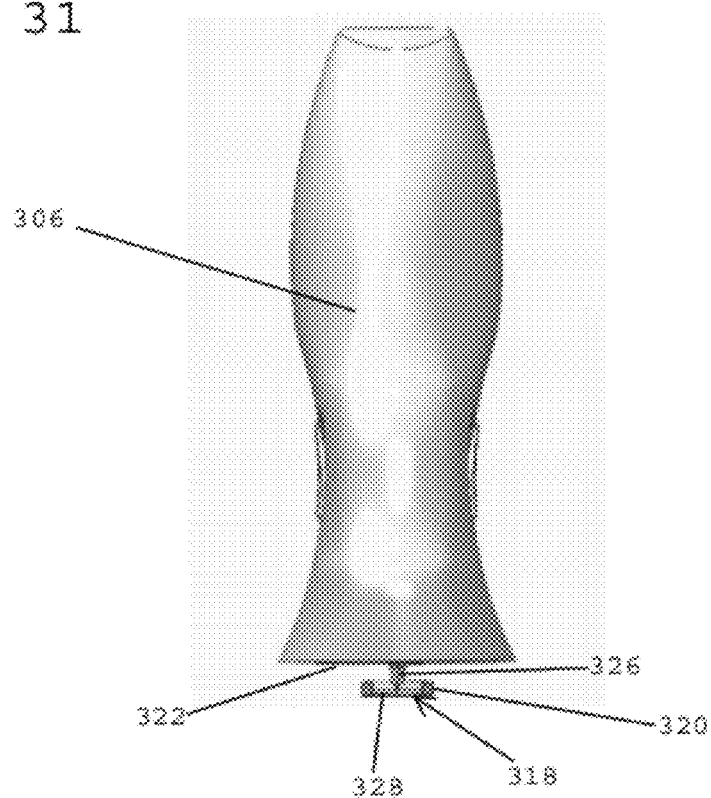
FIG. 31 is a front view of the removable handle of FIG. 29.
Figure 32:
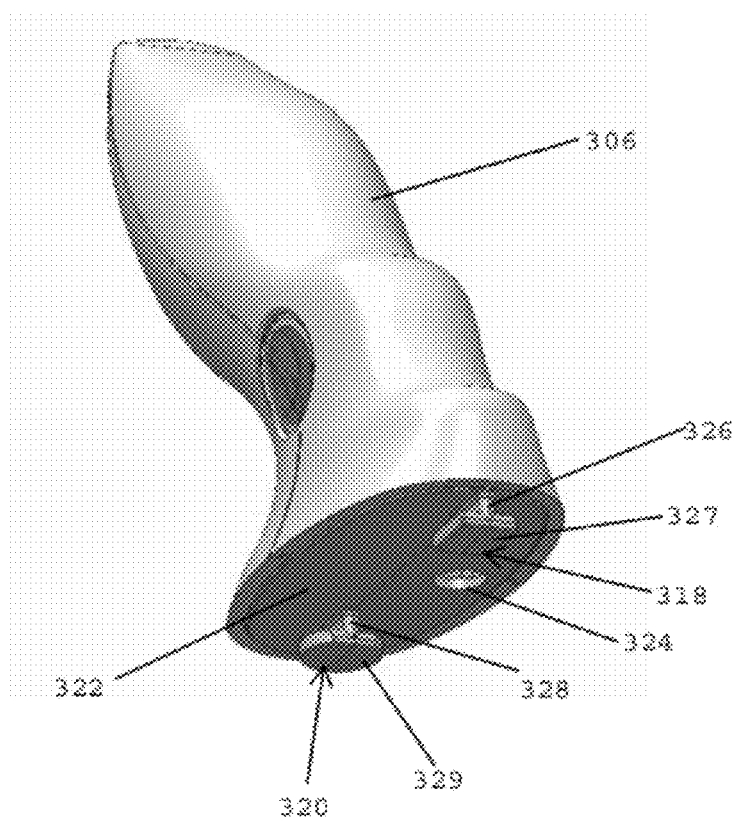
FIG. 32 is a perspective view of the removable handle of FIG. 29.

Referring now to FIGS. 27 and 28, inner mounting plate 308 of handle assembly 302 includes a release tab 316 to permit the release and removal of handle 306 from assembly 302. Release tab 316 is preferably positioned and configured to permit a user to press down on an outer portion of the tab extending beyond the handle without the need for tools or other devices. Release tab 316 may be fixed to plate 308 along a base 317 with an opposite end of the tab free to move when a user depresses the free end. Plate 308 may also include two openings 319 and 321 to receive keyed tabs 318 and 320, respectively, on handle 306. Openings 319 and 321 are sized to permit tabs 318 and 320 to be positioned in a first position permitting the removal of the handle or in a second position (shown in FIG. 28) where the handle is secured to plate 308. From the position shown in FIG. 28, a portion of tab 316 engages handle 306 to prevent the movement of handle 306 from the second position to the first position for removal. Moving tab 316 down and away from handle 306 will allow handle 306 to be moved to the second position and removed from plate 308.

Referring now to FIGS. 29 to 32, handle 306 includes a base plate 322 from which tabs 318 and 320 extend. In addition, a recess or opening 324 may be included in the base plate to receive a detent or protrusion (shown below) that may be part of tab 316. Tabs 318 and 320 may be preferably differently shaped to ensure that handle 306 is inserted into handle assembly 302 in a correct orientation. Since plate 308 is rotatably mounted within handle assembly 302, there is not set orientation in which the plate will be located when a user wishes to insert the handle. The differential shaping of the tabs should help prevent improper insertion and to ensure proper engagement and functioning of the release mechanism to permit future removal of the handle.

Tabs 318 and 320 are preferably offset from base plate 322 by webs, 326 and 328, respectively and include heads 327 and 329, respectively, positioned off the base plate. Heads 327 and 329 may have the differential shapes to ensure proper insertion. Alternatively, the webs may have different sizes or widths to prevent improper insertion into correspondingly different shaped openings 319 and 321 in plate 308.

Figure 33:
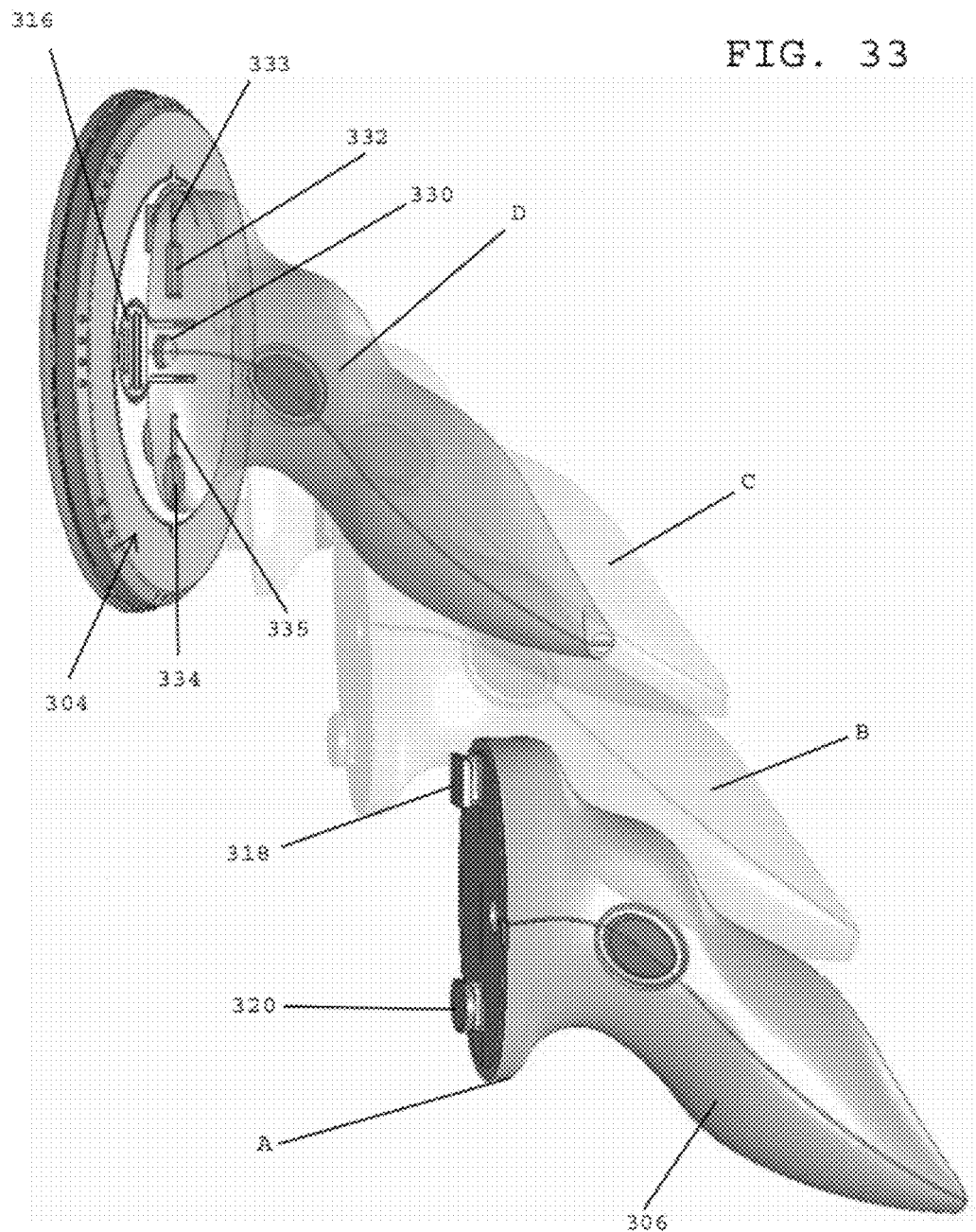
FIG. 33 is a side view illustrating the mounting of the removable handle of FIG. 30 into the handle assembly of FIG. 23.

FIG. 33 illustrates movement of a separated handle 306 into engagement with a tablet mounted assembly 304. In position A, a user has positioned handle 306 adjacent tablet mounted assembly 304. In positions B and C, the handle is shown in ghost lines moving toward engagement with assembly 304. Tab 318 engages opening 319 and tab 320 engages opening 321. Opening 319 includes a larger portion 332 sized to receive head 327 of tab 318. Opening 321 includes a larger portion 334 sized to receive head 329 of tab 320. In this position, base plate 322 of handle 306 engages a stop 330 that is part of release tab 316 and presses release tab 316 downward.

Once both tabs have been initially received within the appropriate openings, handle 306 may be slid forward so that the webs 326 and 328 engage narrower portions 333 and 335 of openings 319 and 321, respectively. Narrower portions 333 and 335 are preferably sized to allow webs 326 and 328 to move freely but are sized smaller than heads 327 and 329, preventing handle 306 from being pulled away from mounting plate 308. As the webs moves into the narrower portions of the openings, stop 330 comes into engagement with opening 324 and release tab 316 returns to its normal, un-depressed state. Engagement of stop 330 within opening 324 prevents handle 306 from sliding back so that the heads are aligned with the wider portions of the openings. This secures handle 306 to mounting plate 308 but allows easy removal of the handle when the user depresses the release tab to disengage stop 330 from opening 324, so that handle 306 may be slid back and removed from the mounting plate.

Figure 34:
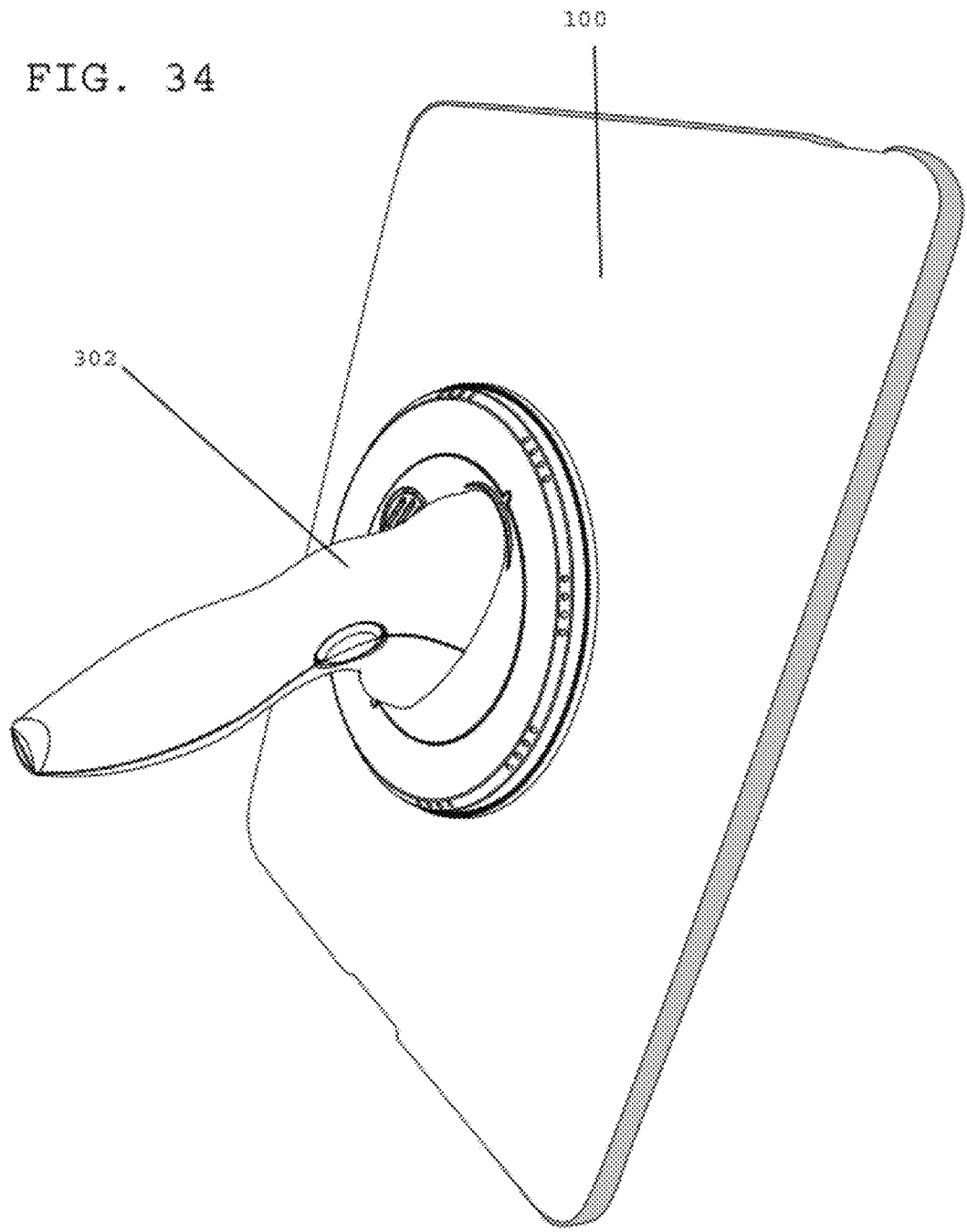
FIG. 34 is a perspective view of the assembly of FIG. 23 mounted to a tablet device.

FIG. 34 illustrates handle assembly 302 mounted to a tablet device 100 with handle 306 positioned on and engaged by mounting plate 308.

Figure 35:
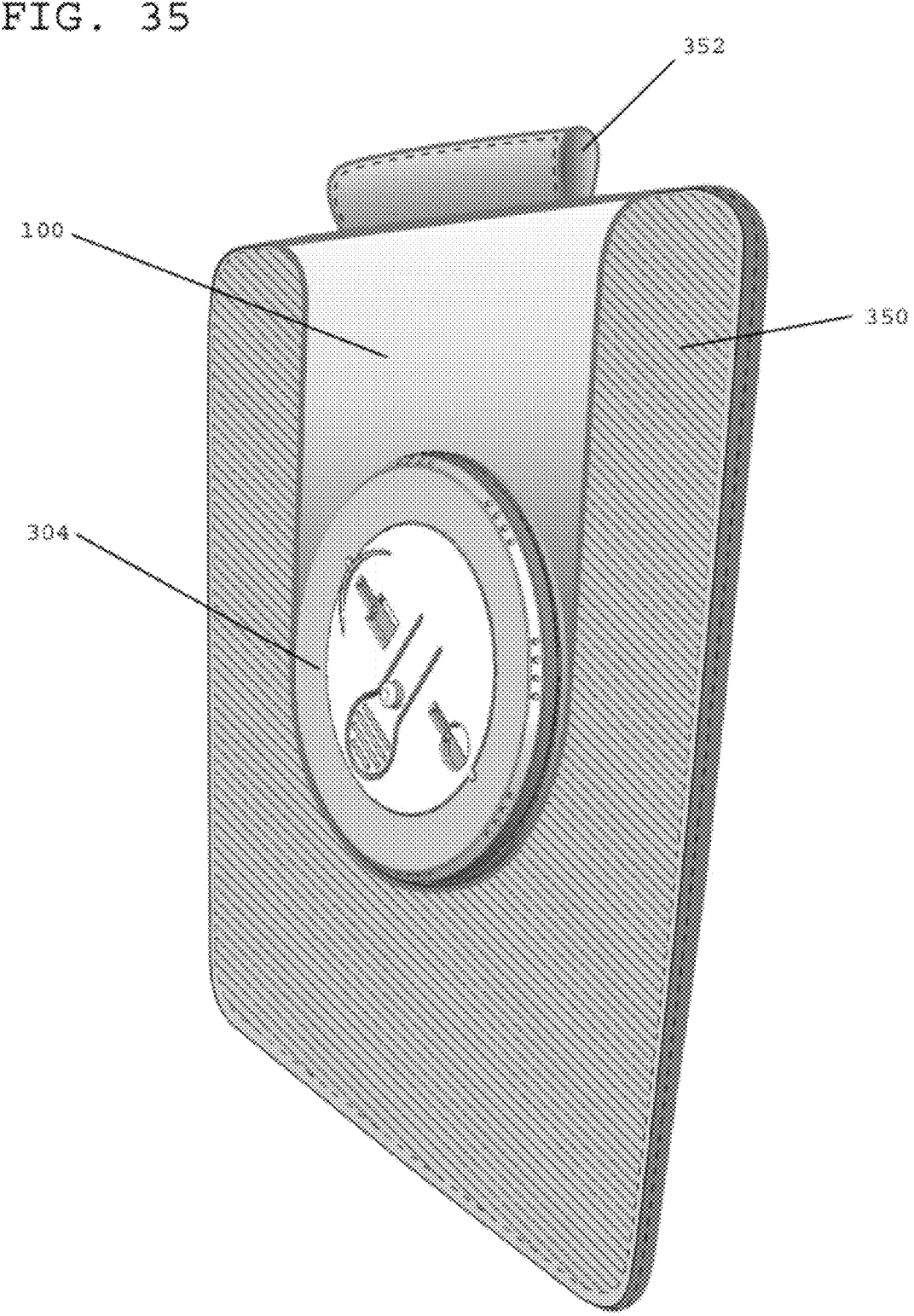
FIG. 35 is a perspective view of a holster according to the present disclosure for receiving and carrying a tablet device with the handle assembly of the present disclosure.

FIG. 35 illustrates a holster 350 for carrying a tablet 100 having a tablet mounted assembly 304 (with or without a handle 306 mounted). Holster 350 may be configured to carry the tablet with the screen positioned against a protective inner face while still providing access to the handle (if mounted) or the tablet mounted assembly to permit a handle to be attached as needed. For transportation and storage, the handle may be removed, as shown. The tablet may be carried securely in the holster until needed, and then may be removed from use. Holster 350 may include a belt clip 352 or similar or equivalent structure to permit secure hands-free carriage of the tablet and holster.

Figure 36:
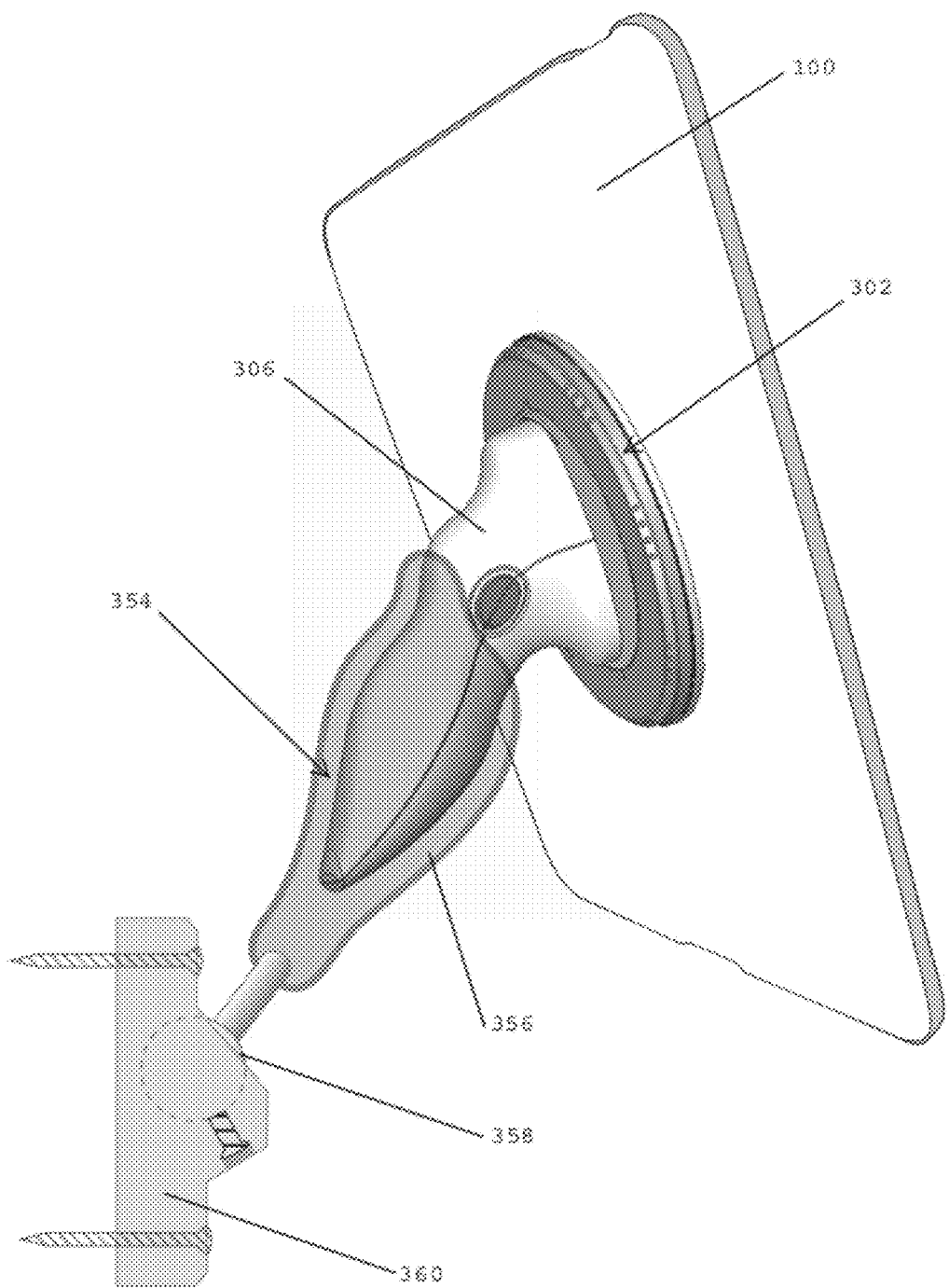
FIG. 36 is a schematic view of a tablet mounting assembly for use with a tablet device and handle assembly of the present disclosure.

FIG. 36 illustrates a tablet mounting assembly 354 that is configured to engage handle 306 of assembly 302. Mounting assembly 354 may include a handle engaging portion 356 that is mounted via an articulated joint 358 to a wall or panel mount 360. Tablet mount 354 would permit a user to carry tablet 100 into proximity of the mount with handle 306 in place. Then, without removing handle 306, tablet 100 may be secured in the tablet mount for hands free use by inserting handle 306 into handle engaging portion 356. Non-limiting examples of possible installation locations for tablet mounting assembly 354 include but are not limited to automobile dashboards, aircraft instrument panels, bulkheads adjacent machinery, walls adjacent hospital beds, walls adjacent food preparation or cooking areas, etc. When the user needs to move on, the tablet may be moved by simply withdrawing handle 306 from handle engaging portion 356 and transporting the tablet to a new location. Given the plethora of applications available for tablet devices and the ability of these devices to support many different tasks or activities, the ability to quickly move and secure a tablet device provides a great benefit to users, in addition to the benefits provide by having secure one-handed control of the device provided by the handle assembly of the present disclosure.

Figure 37:
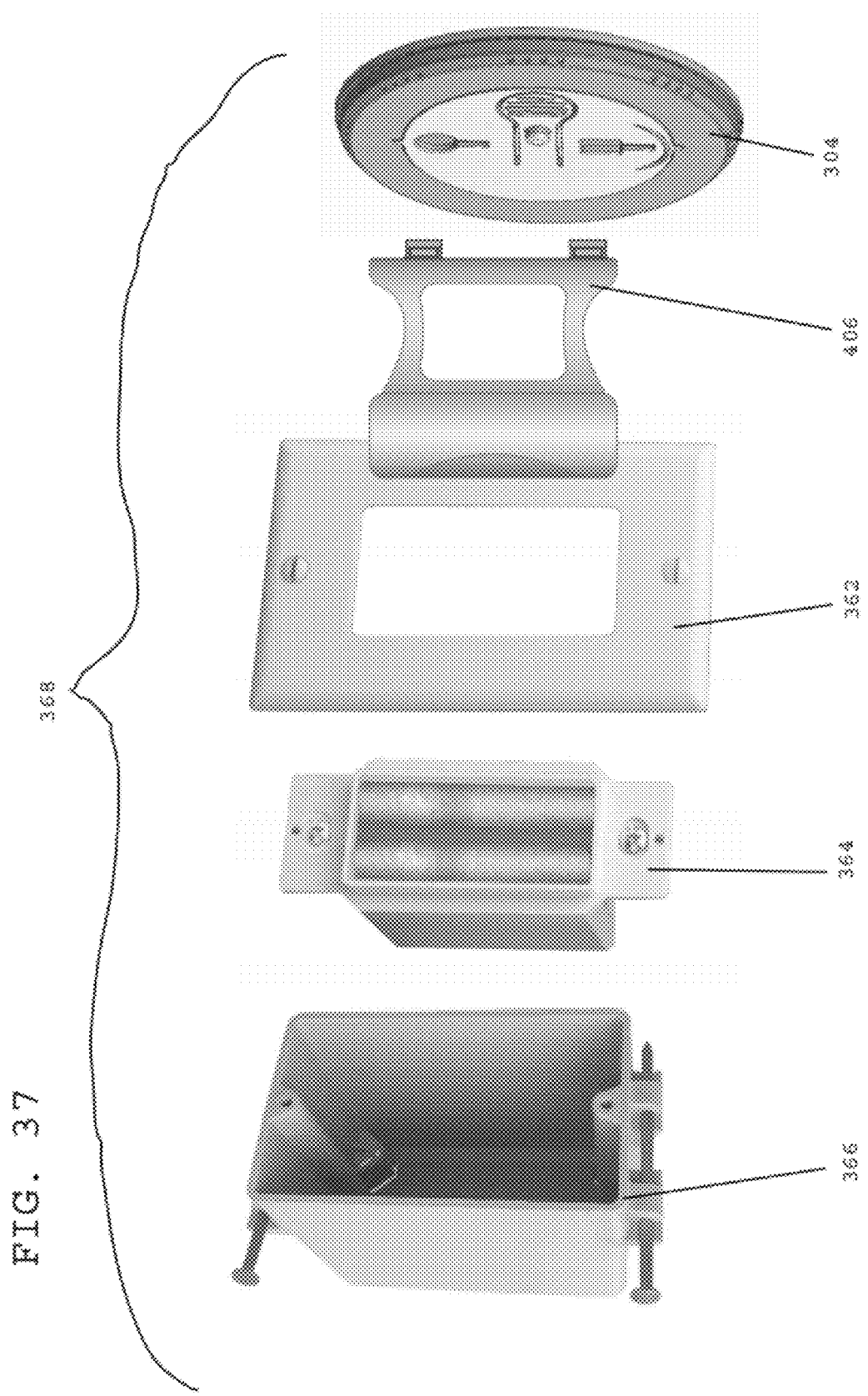
FIG. 37 is an exploded side perspective view of a wall mounting assembly for tablet devices according to the present disclosure.

FIG. 37 illustrates a further embodiment of a tablet holding assembly 368 for mounting a tablet 100 to a wall or other structure. An alternative handle 406 may be mounted into tablet mounted assembly 304 according to the present disclosure. Handle 406 may then be received within a receiver 364 that may be mounted within a standard wall outlet box 366 and covered with a standard outlet plate 362. Assembly 368 would permit a mounting point to be provided in wall, bulkhead or other structural element using predominantly off the shelf components that may be installed without any specialized knowledge, training or tools.

Assemblies 368 and 350 are intended to be merely illustrative of mounting arrangements that may be utilized with handle mounting assemblies according to the present disclosure.

Figure 38:
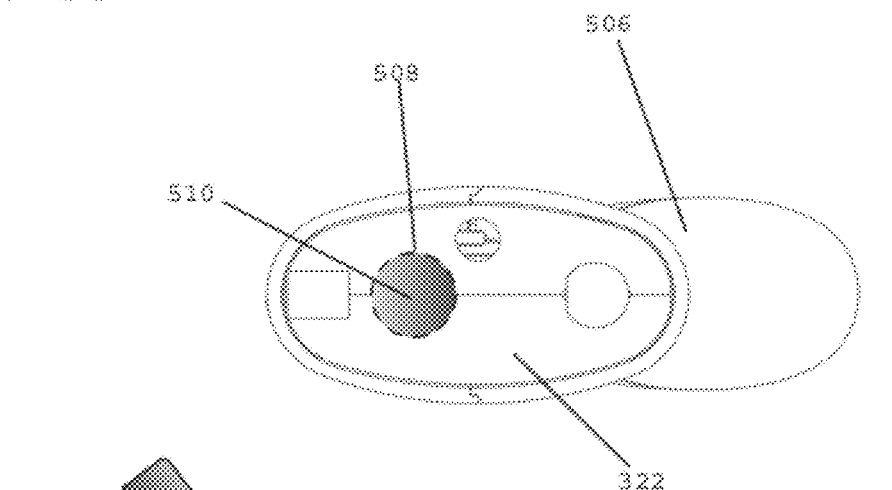
FIG. 38 is a bottom view of an alternative embodiment of removable handle according to present disclosure including a storage opening.
Figure 39:
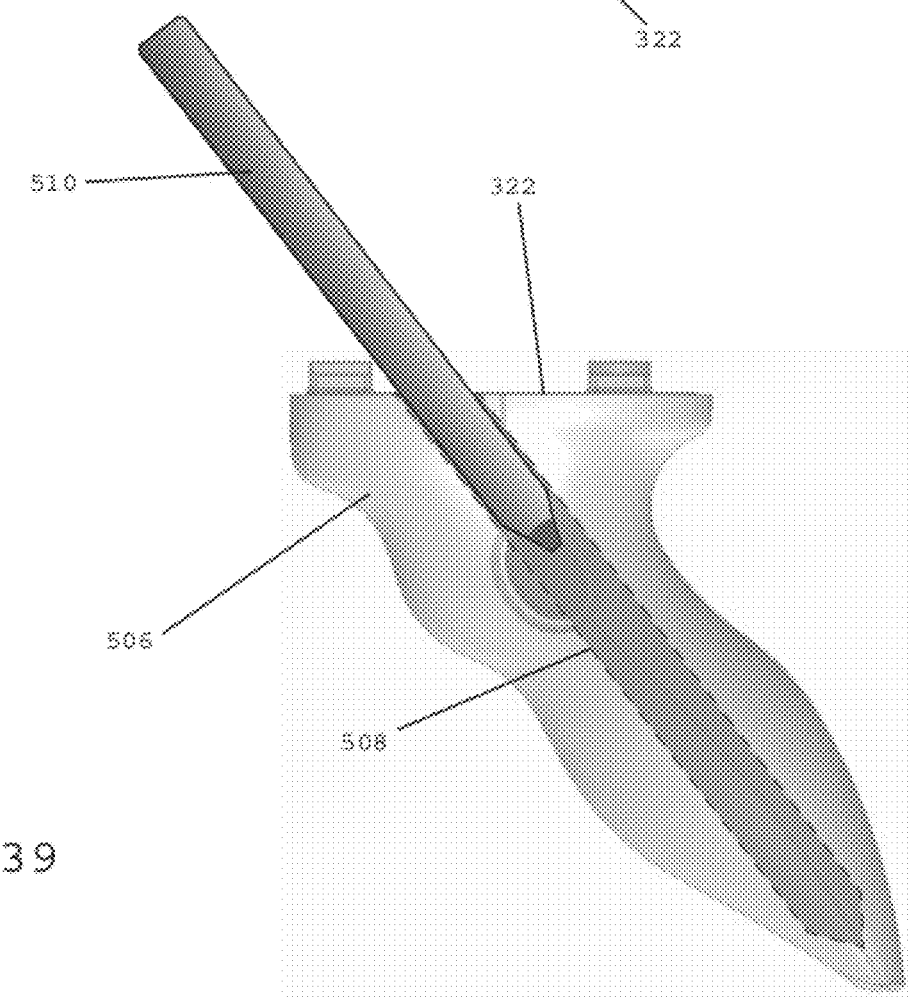
FIG. 39 is a side of the removable handle of FIG. 38 with a stylus partially positioned within the storage opening.

FIGS. 38 and 39 illustrate a further embodiment of a handle 506 including an internal storage opening 508 accessible through base plate 322 for carrying, for example, a stylus for use with a tablet device.

Figure 40:
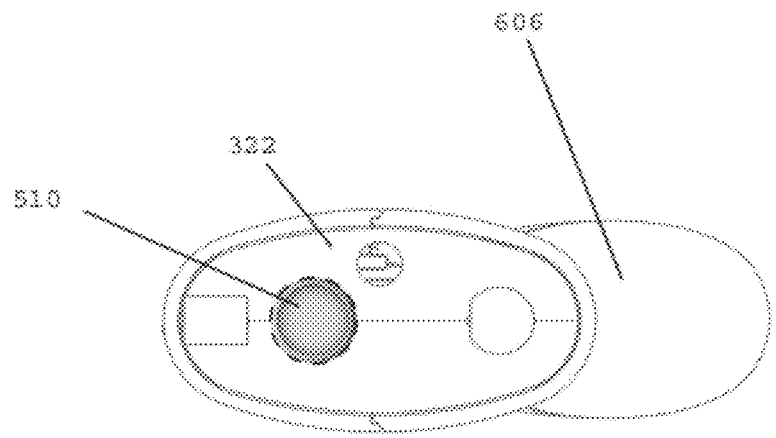
FIG. 40 is a bottom view of a third alternative embodiment of a removable handle according to the present disclosure with an internal light system.
Figure 41:
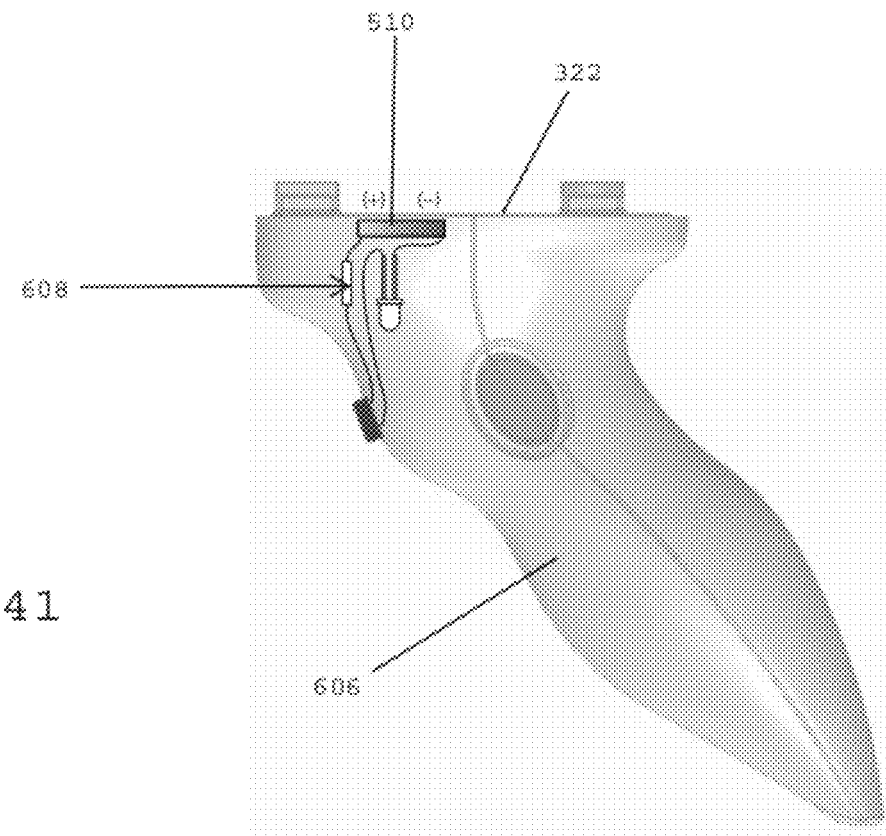
FIG. 41 is a side view of the removable handle of FIG. 40.

FIGS. 40 and 41 illustrate a still further embodiment of a handle 606 that may include a lighting device 608 such as an LED and power assembly for the LED within an interior of the handle. Such an assembly may permit a user to visualize objects in a dark environment while carrying the tablet and handle assembly according to the present disclosure. A battery for the lighting device may be accessible through base plate 322.

Figure 42:
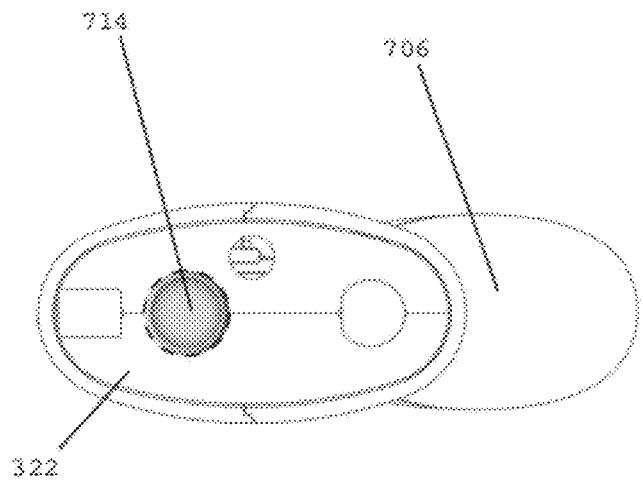
FIG. 42 is a bottom view of a fourth alternative embodiment of a removable handle according the present disclosure with an internal Bluetooth control arrangement.
Figure 43:
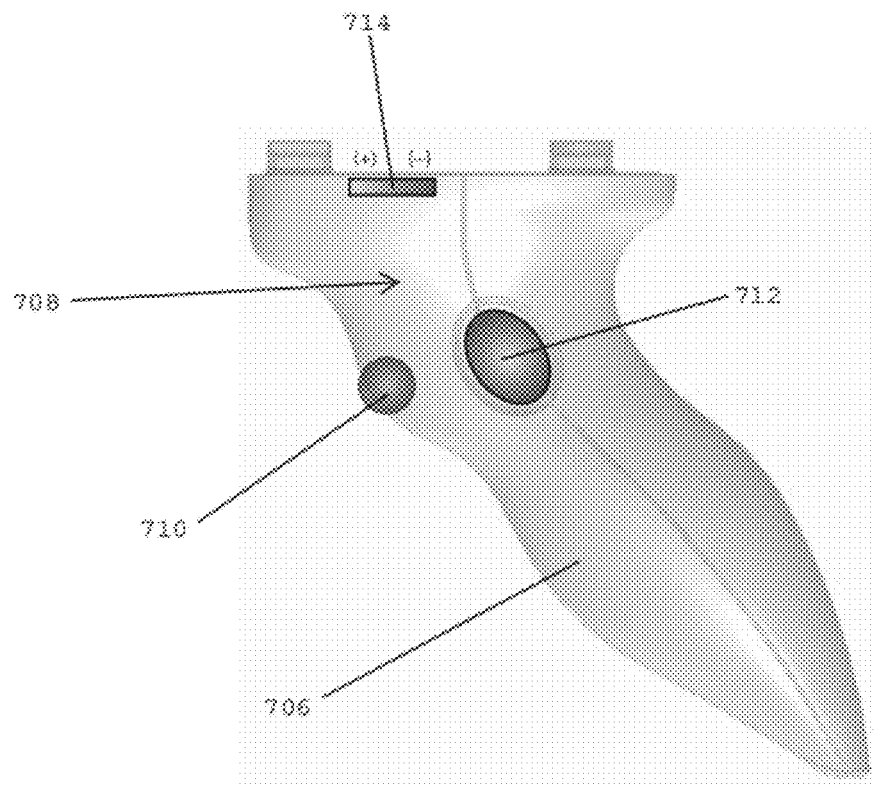
FIG. 43 is a side view of the removable handle of FIG. 42.

FIGS. 42 and 43 illustrate another embodiment of a handle 706 according to the present disclosure which may include wireless control features for the tablet, such as but not limited to a Bluetooth compatible control 708. Control 708 may include one or more elements to be engaged by a user grasping handle 706. Such elements may include but are not limited to a navigation button 710 and a selection button 712. A battery 714 to power the control feature may be accessible through base plate 322. Other similar or compatible control features may be included in a handle within the scope of the present disclosure.

Figure 44:
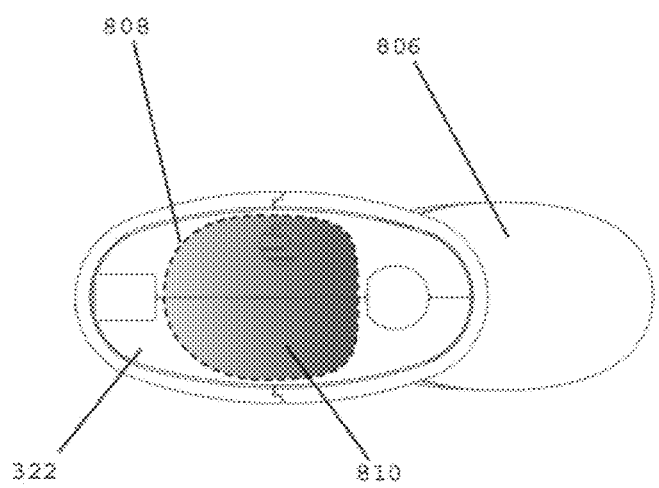
FIG. 44 is a bottom view of a fifth embodiment of a removable handle according to the present disclosure with an internal storage cavity.
Figure 45:
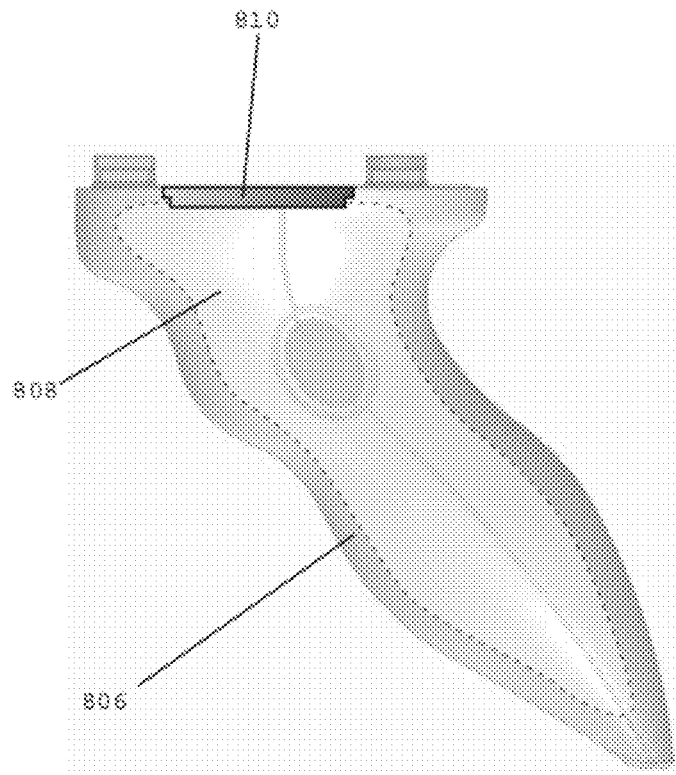
FIG. 45 is a side view of the removable handle of FIG. 44.

FIGS. 44 and 45 illustrate an embodiment of a handle 806 according to the present disclosure with a multipurpose storage cavity 808 within the handle. A removable cover 810 may be positioned over the cavity in base plate 322 so that the mounting and release features of the handle described above are preserved. Non-limiting examples of uses for cavity 808 may include storage for extra flash drives or other memory devices, storage for earbuds, earphones, a cell phone head set, a microphone, a Bluetooth device, storage for a cleaning cloth, power or interface cords for the tablet, electronics for interfacing with security devices, or other suitable functions. It is also anticipated that other electronic devices may be embedded within the handle such as but not limited to longer distance passive or active wireless communications devices, GPS receivers, transponders, or other similar devices.

While the present disclosure has used a tablet computer as the primary device to which the handle assembly may be attached, it is not intended to limit the use of the present handle assembly to tablet computers. It is anticipated that other electronics devices, such as but not limited to other portable computers, portable video or image display devices, and other devices might be adapted to use the handle assembly of the present disclosure. The size and shape of the handle included in the handle assembly of the present disclosure may be selected to ensure that the device to which the handle assembly is attached may be presented or oriented at the desired angle when positioned on a surface as illustrated herein. This desired angle may be steeper or shallower than those illustrated herein and still within the scope of the present disclosure.

While the invention has been described with reference to preferred embodiments, it is to be understood that the invention is not intended to be limited to the specific embodiments set forth above. Thus, it is recognized that those skilled in the art will appreciate that certain substitutions, alterations, modifications, and omissions may be made without departing from the spirit or intent of the invention. Accordingly, the foregoing description is meant to be exemplary only, the invention is to be taken as including all reasonable equivalents to the subject matter of the invention, and should not limit the scope of the invention set forth in the following claims.

What is claimed is:

1. A handle assembly for a handheld electronic device, the handheld electronic device including a screen and a back side opposite the screen, the handle assembly comprising: a device mounted assembly attached to the back side of the handheld electronic device, the device mounted assembly including a fixed portion and a rotating portion with a mounting plate; a handle removably mounted to the device mounted assembly; the handle further comprising a base plate including two tabs, with each tab including a web and a head, the mounting plate including two openings, with each opening including a first portion sized to receive the head of one of the two tabs and a second portion sized to receive the web of one of the two tabs but not allowing the head of the tab to be removed from the mounting plate; and, wherein each of the two tabs has a unique head shape and the first portion of at least one of the openings is sized to only receive one of the tab heads; and, wherein the handheld electronic device may be rotated as needed about the handle to permit a user to access the screen from any angle, and the handle configured to permit a user to hold the handheld electronic device with one hand while accessing the screen with the other hand.

2. The handle assembly for a handheld electronic device of claim 1, the mounting plate further comprising a release tab with a stop that releasably engages a recess in the base plate of the handle when the web of at least one tab is within the second portion of the opening, and the engagement of the stop and the recess prevents the handle from being moved so that the tab stays within the second portion of the opening.

3. The handle assembly for a handheld electronic device of claim 1, wherein the device mounted assembly is removably attached to the back of the handheld electronic device.

4. The handle assembly for a handheld electronic device of claim 1, wherein a case is positioned about the handheld electronic device and the device mounted assembly is mounted to the case on a side opposite the screen.

5. The handle assembly for a handheld electronic device of claim 1, further comprising a handle receiving assembly configured to engage the handle of the handle assembly and releasably mount the handheld electronic device to a surface, the handle receiving assembly configured to permit free rotation of the handheld electronic device when engaging the handle.

6. The handle assembly for a handheld electronic device of claim 1, further comprising a holster to receive the handheld electronic device with the handle accessible to a user while the handheld electronic device is received by the holster.

7. The handle assembly for a handheld electronic device of claim 1, the handle further comprising a storage opening within an interior of the handle.

8. The handle assembly for a handheld electronic device of claim 7, further comprising the storage opening of the handle accessible through the base plate of the handle.

9. The handle assembly for a handheld electronic device of claim 1, the handle further comprising a wireless control device for use with the handheld electronic device.

10. The handle assembly for a handheld electronic device of claim 1, the handle further comprising an illumination device.

11. The handle assembly for a handheld electronic device of claim 1, the handle further comprising a stylus removably positioned within the handle.

12. The handle assembly for a handheld electronic device of claim 1, the handle further defining an ergonomic shape to aid the gripping of the handle by a user.

13. The handle assembly for a handheld electronic device of claim 1, the handle further incorporating a pistol grip shape to aid the gripping of the handle by a user.

14. The handle assembly for a handheld electronic device of claim 1, the handle further configured so that the handle serves as a stand and the screen is presented at a desired viewing angle when the handle and handheld electronic device are positioned on a surface.

15. The handle assembly for a handheld electronic device of claim 1, the handle further configured so that the handle serves as a stand and the screen is presented at one of a plurality of viewing angles based on the rotational position of the handle, when the handle and handheld electronic device are positioned on a surface.

\* \* \* \* \*